(12) United States Patent
S et al.

(10) Patent No.: US 11,100,611 B2
(45) Date of Patent: Aug. 24, 2021

(54) SYSTEMS AND METHODS FOR BACKGROUND NOISE REDUCTION IN MAGNETIC RESONANCE IMAGES

(71) Applicant: GE Precision Healthcare LLC, Milwaukee, WI (US)

(72) Inventors: Deepthi S, Palakkad (IN); Dheeraj Kulkarni, Bengaluru (IN); Jignesh Dholakia, Bangalore (IN)

(73) Assignee: GE PRECISION HEALTHCARE LLC, Milwaukee, WI (US)

( * ) Notice: Subject to any disclaimer, the term of this patent is extended or adjusted under 35 U.S.C. 154(b) by 49 days.

(21) Appl. No.: 16/370,709

(22) Filed: Mar. 29, 2019

(65) Prior Publication Data
US 2020/0311877 A1 Oct. 1, 2020

(51) Int. Cl.
| | |
|---|---|
| *G06T 5/00* | (2006.01) |
| *G06T 7/194* | (2017.01) |
| *G06T 7/136* | (2017.01) |
| *G06T 5/20* | (2006.01) |
| *G06F 3/14* | (2006.01) |

(52) U.S. Cl.
CPC ............ *G06T 5/002* (2013.01); *G06T 5/20* (2013.01); *G06T 7/136* (2017.01); *G06T 7/194* (2017.01); *G06F 3/14* (2013.01); *G06T 2207/10088* (2013.01); *G06T 2207/20081* (2013.01); *G06T 2207/20084* (2013.01); *G06T 2207/20092* (2013.01); *G06T 2207/30004* (2013.01)

(58) Field of Classification Search
CPC ............................. A61B 8/5246; G06K 9/34
USPC ................................. 382/135, 170, 128, 171
See application file for complete search history.

(56) References Cited

U.S. PATENT DOCUMENTS

| | | | |
|---|---|---|---|
| 6,240,215 B1 | 5/2001 | Salgado et al. | |
| 7,064,545 B2 | 6/2006 | Zaharchuk et al. | |
| 8,712,137 B2 | 4/2014 | Wollenweber | |
| 2009/0060331 A1 | 3/2009 | Liu et al. | |
| 2009/0087066 A1* | 4/2009 | Odry | G06K 9/4609 |
| | | | 382/131 |
| 2010/0142786 A1* | 6/2010 | Degani | G06T 7/0012 |
| | | | 382/131 |
| 2013/0121552 A1 | 5/2013 | Osztroluczki et al. | |
| 2013/0208961 A1* | 8/2013 | Nieminen | G06T 7/11 |
| | | | 382/128 |

(Continued)

OTHER PUBLICATIONS

Dice, L., "Measures of the Amount of Ecologic Association Between Species," Ecology, vol. 26, No. 3, Jul. 1945, 7 pages.

(Continued)

*Primary Examiner* — Kiet M Doan
(74) *Attorney, Agent, or Firm* — McCoy Russell LLP

(57) ABSTRACT

Methods and systems are provided for reducing background noise in magnetic resonance (MR) image and parametric map visualization using segmentation and intensity thresholding. An example method includes segmenting the MR image or parametric map into foreground which includes a region of anatomy of interest and background which is outside of the region of anatomy of interest, applying an intensity threshold to the background and not applying the intensity threshold to the foreground of the MR image or parametric map to produce a noise reduced MR image or noise reduced parametric map, and displaying the noise reduced MR image or noise reduced parametric map via a display device.

13 Claims, 11 Drawing Sheets

(56) References Cited

U.S. PATENT DOCUMENTS

| | | | |
|---|---|---|---|
| 2015/0086096 A1 | 3/2015 | Liu et al. | |
| 2017/0069082 A1 | 3/2017 | Mailhe et al. | |
| 2017/0140551 A1* | 5/2017 | Bauer | G06K 9/6256 |
| 2018/0232887 A1 | 8/2018 | Lin et al. | |
| 2018/0322637 A1 | 11/2018 | Ghesu et al. | |
| 2020/0126214 A1* | 4/2020 | Hu | A61B 6/032 |

OTHER PUBLICATIONS

Otsu, N., "A Threshold Selection Method from Gray-Level Histograms," IEEE Transactions on Systems, Man, and Cybernetics, vol. SMC-9, No. 1, Jan. 1979, 5 pages.

Sharma, N. et al., "Automated medical image segmentation techniques," Journal of Medical Physics, vol. 35, No. 1, Jan. 2010, 12 pages.

Ronneberger, O. et al., "U-Net: Convolutional Networks for Biomedical Image Segmentation," Proceedings of the 2015 International Conference on Medical Image Computing and Computer-Assisted Intervention (MICCAI 2015), Oct. 5, 2015, Available Online May 18, 2015, Munich, Germany, 8 pages.

Kalinovsky, A. et al., "Lung Image Segmentation Using Deep Learning Methods and Convolutional Neural Networks," Proceedings of the International Conference on Pattern Recognition and Information Processing, Oct. 3, 2016, Minsk, Belarus, 4 pages.

Shah, M., "Semantic Segmentation using Fully Convolutional Networks over the years," Meet Shah Blog Website, Available Online at https://meetshah1995.github.io/semantic-segmentation/deep-learning/pytorch/visdom/2017/06/01/semantic-segmentation-over-the-years.html, Jun. 1, 2017, 22 pages.

Garcia-Garcia, A. et al., "A Review on Deep Learning Techniques Applied to Semantic Segmentation," Cornell University arXiv Website, Available Online at https://arxiv.org/abs/1704.06857, Apr. 22, 2017, 23 pages.

* cited by examiner

SYSTEMS AND METHODS FOR BACKGROUND NOISE REDUCTION IN MAGNETIC RESONANCE IMAGES

FIELD

Embodiments of the subject matter disclosed herein relate to magnetic resonance imaging (MRI), and more particularly, to background noise reduction in visualizing MR images and parametric maps using segmentation and thresholding.

BACKGROUND

Magnetic resonance imaging (MRI) is a medical imaging modality that may create images of the inside of a human body without using x-rays or other ionizing radiation. MM systems include a superconducting magnet to create a strong, uniform, static magnetic field $B_0$. When an imaging subject is placed in the magnetic field $B_0$, the nuclear spins associated with the hydrogen nuclei in the imaging subject become polarized such that the magnetic moments associated with these spins become preferentially aligned along the direction of the magnetic field $B_0$, resulting in a small net magnetization along that axis. The hydrogen nuclei are excited by a radio frequency signal at or near the resonance frequency of the hydrogen nuclei, which add energy to the nuclear spin system. As the nuclear spins relax back to their rest energy state, they release the absorbed energy in the form of an RF signal. This RF signal (or MR signal) is detected by one or more RF coil assemblies and is transformed into the image using reconstruction algorithms.

In addition to contrasts (e.g., T1- and T2-weighted contrasts) achieved by regular anatomical MRI, unique contrast mechanisms such as diffusion-weighted imaging (DWI), perfusion-weighted imaging (PWI), and functional MM (fMRI) have revolutionized detection of pathologic conditions, providing great insight into physiologic mechanisms and pathologic conditions. Low signal to noise ratio (SNR) has been a major limitation of these contrast mechanisms. For example, background noise (signal from regions outside of anatomy of interest, generally comprising air) deteriorates the quality of magnetic resonance (MR) images and corresponding parametric maps, such as apparent diffusion coefficient (ADC) maps. Conventional visualization and post-processing approaches rely on setting a fixed intensity threshold for suppressing background noise. Pixels or voxels in the MR image or parametric map with an intensity below the fixed intensity threshold are masked (their intensity is set to zero) while pixels/voxels having an intensity greater than the fixed intensity threshold remain unmasked. However, this may result in loss of information of the anatomical regions being imaged, as the MR images of the anatomy may comprise pixels below the threshold intensity, and therefore masking these pixels may produce holes in the anatomy being imaged, degrading MR image quality.

Improved background suppression technology for visualizing MR image/map is generally desired.

SUMMARY

The present disclosure at least partially addresses the issues described above. In one embodiment, a method for visualizing a magnetic resonance (MR) image or an MR parametric map comprises: segmenting the MR image or parametric map into foreground which includes a region of anatomy of interest and background which is outside of the region of anatomy of interest; applying an intensity threshold to the background and not applying the intensity threshold to the foreground of the MR image or parametric map to produce a noise reduced MR image or noise reduced parametric map; and displaying the noise reduced MR image or noise reduced parametric map via a display device.

In this way, background noise may be selectively reduced by first segmenting the MR image/map into foreground (the region of anatomy of interest in the MR image/map) and background (outside of the region of anatomy of interest). In some embodiments, the segmentation is performed by a neural network, which has been trained to classify each pixel/voxel of the MR image/map as belong to either background or foreground. Then an intensity threshold is applied selectively to the background, and not to the foreground. This may enable greater background noise reduction while reducing or eliminating holes in the anatomical regions of the MR image, as even if a region of the foreground includes pixels/voxels of a lower intensity than the intensity threshold, the foreground pixels/voxels may remain unmasked, as the intensity threshold is applied only to the background pixels/voxels. Thus, a higher intensity threshold may be applied to the background than would otherwise be feasible, enabling greater background noise reduction without losing information from the anatomical regions of interest in the MR image/map.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
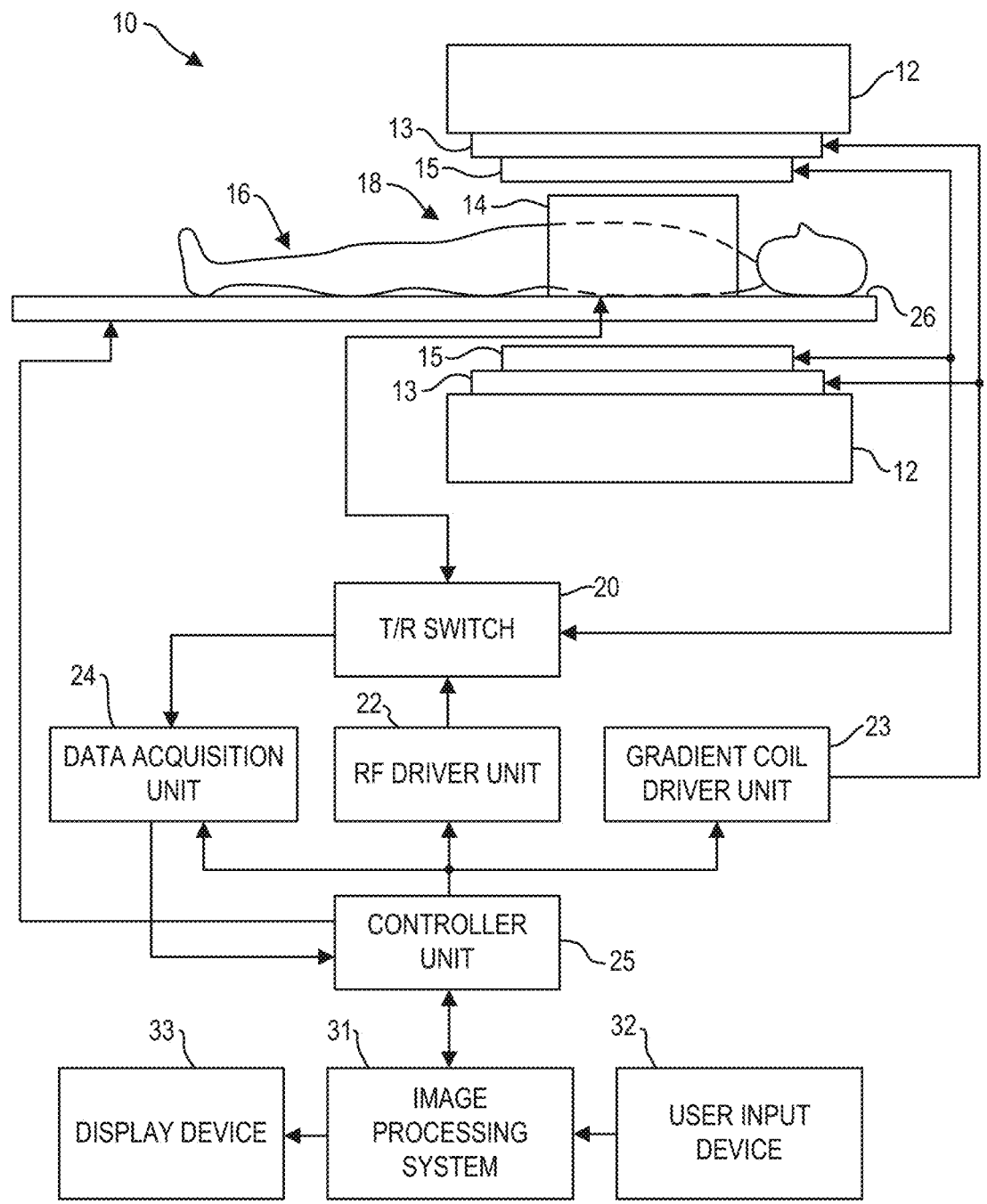
FIG. 1 shows a block diagram of an exemplary embodiment of an MRI system.

Low signal to noise ratio (SNR) has been a major limitation of some MR contrast mechanisms, such as fMRI, PWI, DWI, and corresponding parametric maps, such as ADC maps. For example, background noise (signal from regions outside of anatomy of interest, generally comprising air) may deteriorate the quality of magnetic resonance (MR) images and parametric maps. Conventional visualization/ post-processing approaches rely on setting a fixed intensity threshold for suppressing background noise, where pixels/ voxels in the MR image/map with an intensity below the fixed intensity threshold are masked (their intensity is set to zero) while pixels/voxels having an intensity greater than the fixed intensity threshold remain unmasked.

There are several issues with this approach. In one example, a fixed threshold may be suboptimal for many images, and a user may need to manually adjust the intensity threshold to obtain a desired visualization of the MR image, thereby causing the user inconvenience. For example, regions of the anatomy which a user wishes to visualize may comprise anatomical regions where the intensity is lower than the fixed intensity threshold, and the regions may therefore be masked out by application of the fixed intensity threshold to the MR image, thus creating "holes" in the anatomy. The user may manually adjust the intensity threshold to eliminate these "holes" and visualize all regions of the anatomy. However, this may significantly increase the visualization of background noise, and impair the contrast in the MR image.

Visualization applications use a "windowing" approach to visualize medical images captured with higher precisions or higher dynamic ranges of intensity values than standard images. The approach maps an intensity interval of interest to the dynamic range of the display. The applications set up the range of interval and center of this interval for the mapping. In some occasions, the range of interval and center of interval are not optimal due to the background noise.

The present disclosure at least partially addresses the above issues. MR image processing system 200, shown in FIG. 2, receives MR images and/or parametric maps produced by magnetic resonance imaging (MRI) system 10 shown in FIG. 1, and executes method(s) disclosed herein for reducing background noise in the received MR images/ maps. MR image processing system 200 may be incorporated into MM system 10 or communicably coupled to MM system 10, or may be configured to receive MR images/ maps from storage devices which store the MR images/ maps. MR image processing system 200 may execute method 400 for reducing background noise shown in FIG. 4, method 500 for determining a threshold intensity shown in FIG. 5, and/or method 600 for suppressing background noise in MR images shown in FIG. 6.

Figure 3:
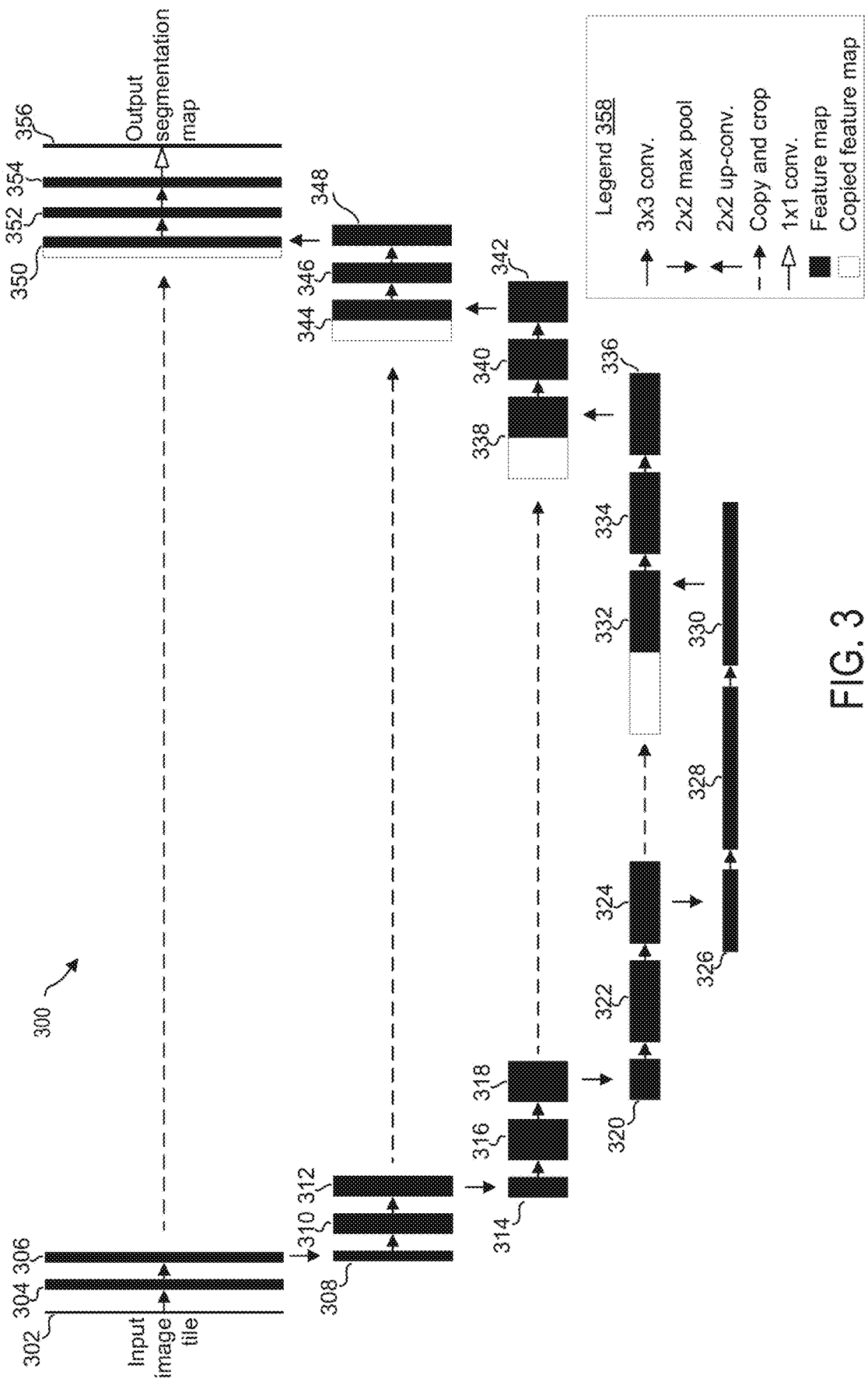
FIG. 3 shows an exemplary embodiment of a convolutional neural network architecture for segmenting MR images and/or parametric maps.

In some embodiments, MR image processing system 200 may be configured to segment an MR image/map into foreground and background using a trained neural network, such as a convolutional neural network (CNN) shown in FIG. 3. As used herein, "foreground" refers to a region of anatomy of interest in an MR image or a parametric map, while "background" refers to outside of the region of anatomy of interest. The neural network has been trained to classify each of the plurality of pixels/voxels of the MR image/map as belonging to either the foreground or background. Then an intensity threshold is selectively applied to the background and not the foreground of the MR image/ map, thereby mitigating loss of information from anatomical features in the MR image/map while enhancing background noise reduction. In some embodiments, the intensity threshold to be selectively applied to the background pixels/voxels of the MR image/map is determined according to method 500 shown in FIG. 5.

Figure 7:
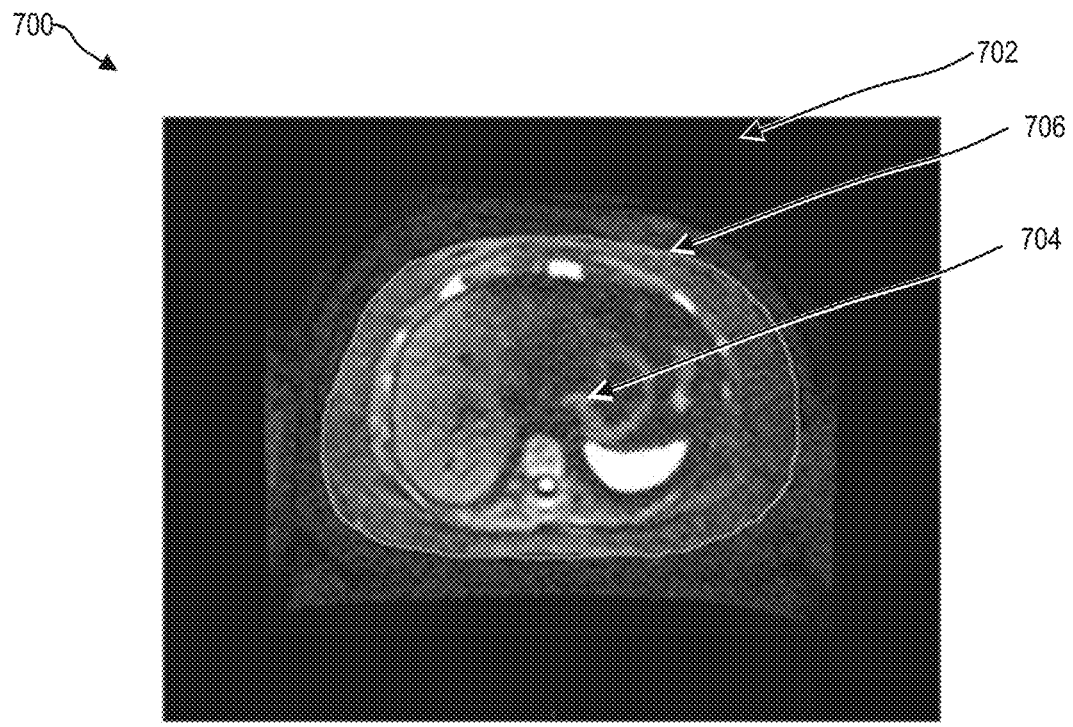
FIG. 7 illustrates background and foreground of an exemplary MR image of abdomen.
Figure 8:
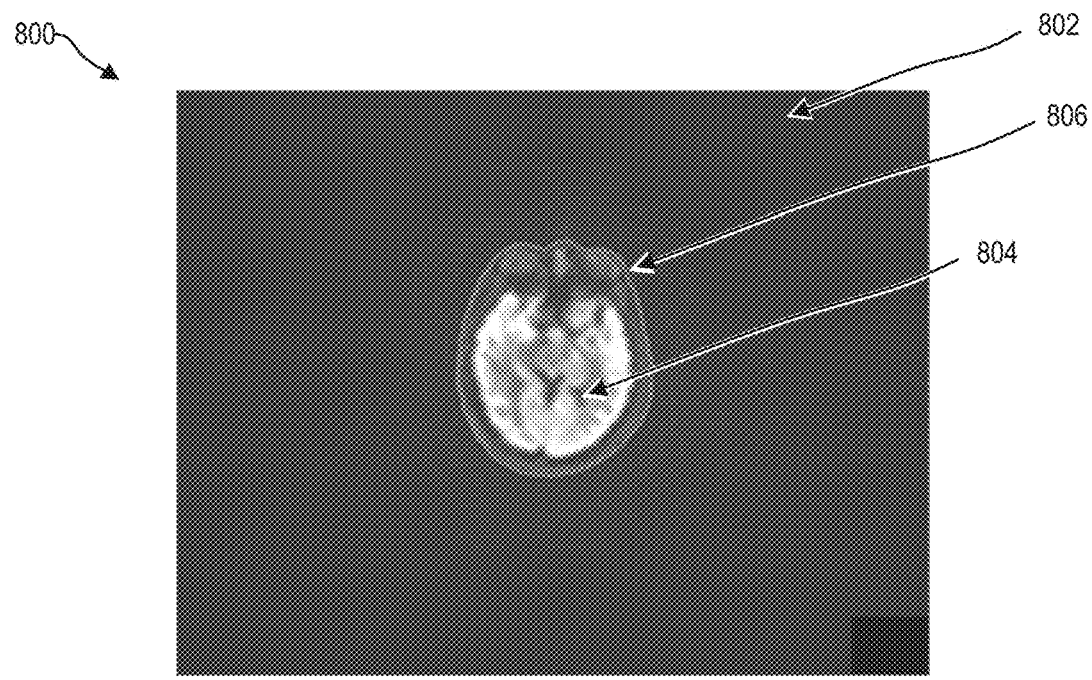
FIG. 8 illustrates background and foreground of an exemplary MR image of brain.
Figure 9:
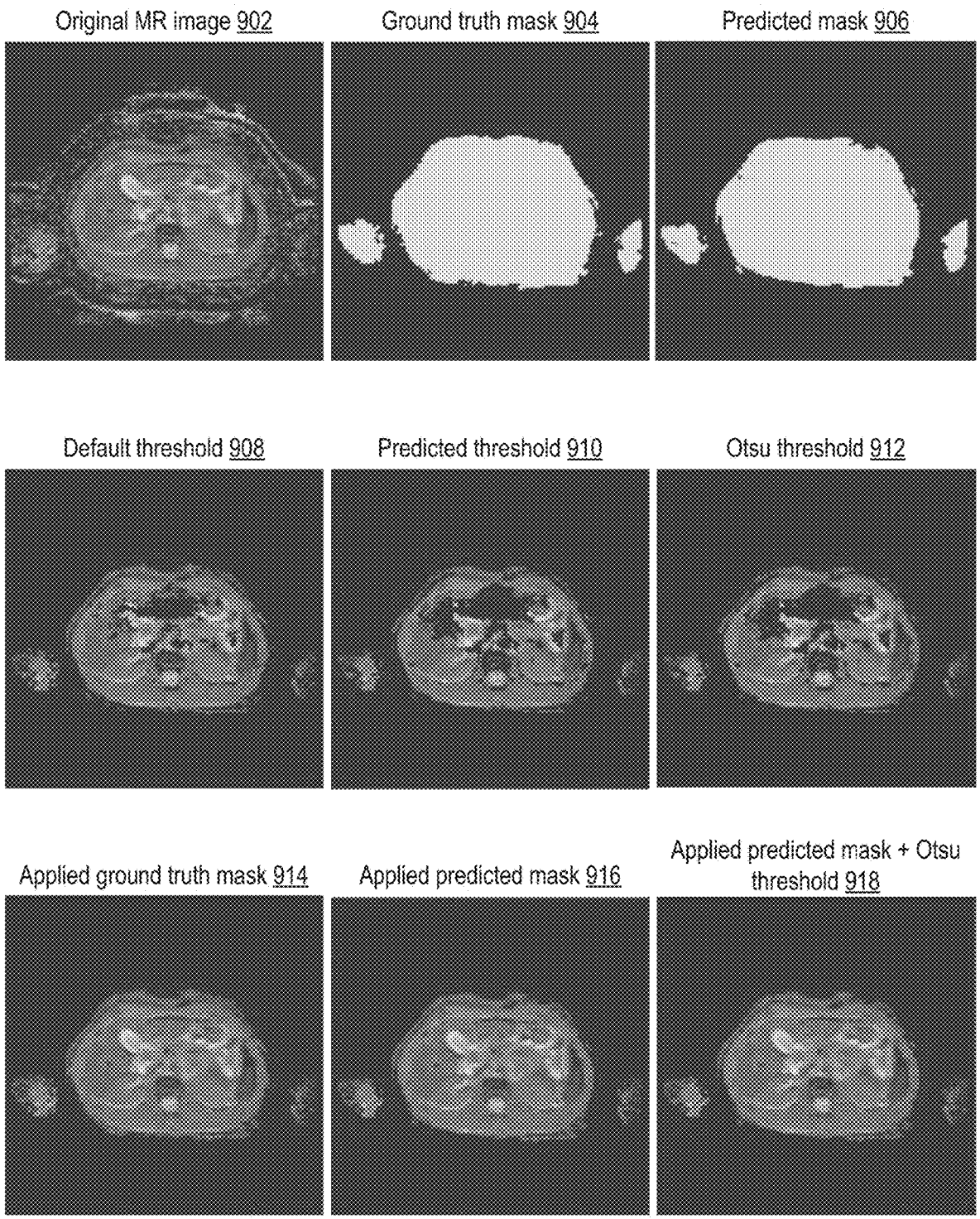
FIG. 9 shows a comparison between MR images of abdomen with background suppression according to various approaches.
Figure 10:
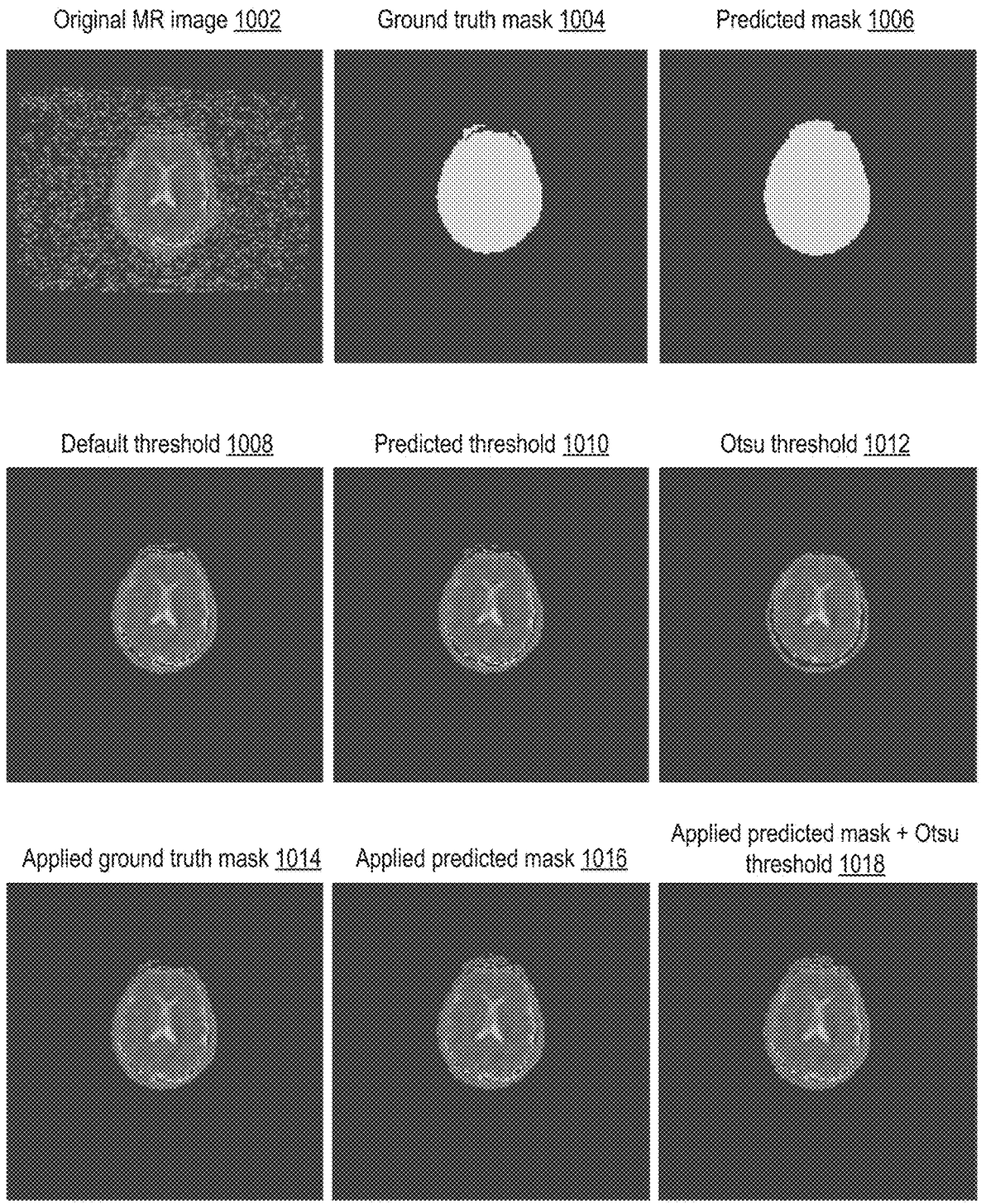
FIG. 10 shows a comparison between MR images of brain with background suppression according to various approaches.
Figure 11:
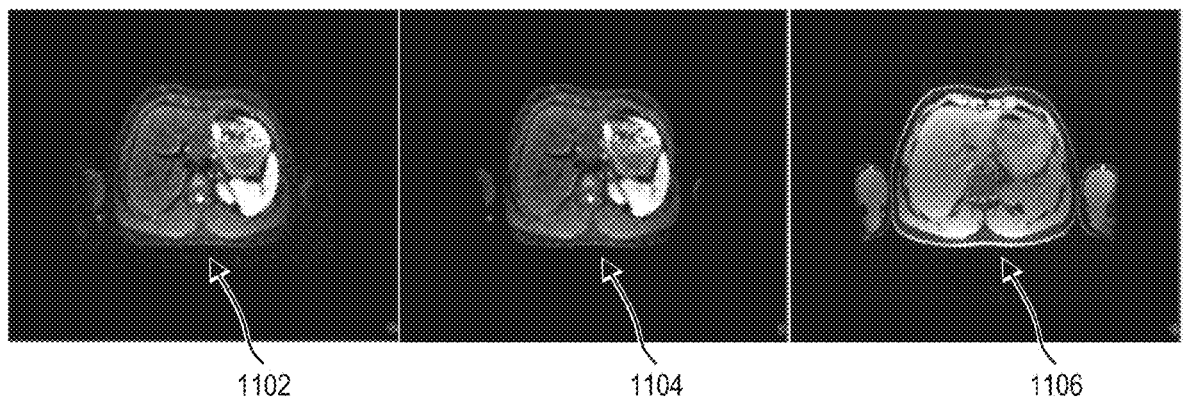
FIG. 11 shows a side-by-side comparison between MR images of abdomen with and without background suppression in a visualization application.
Figure 12:
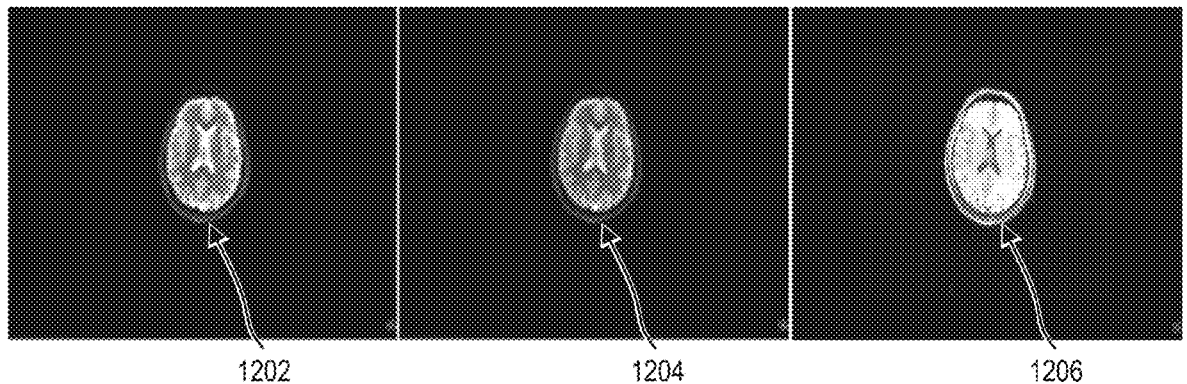
FIG. 12 shows a side-by-side comparison between MR images of brain with and without background suppression in a visualization application.
Figure 13:
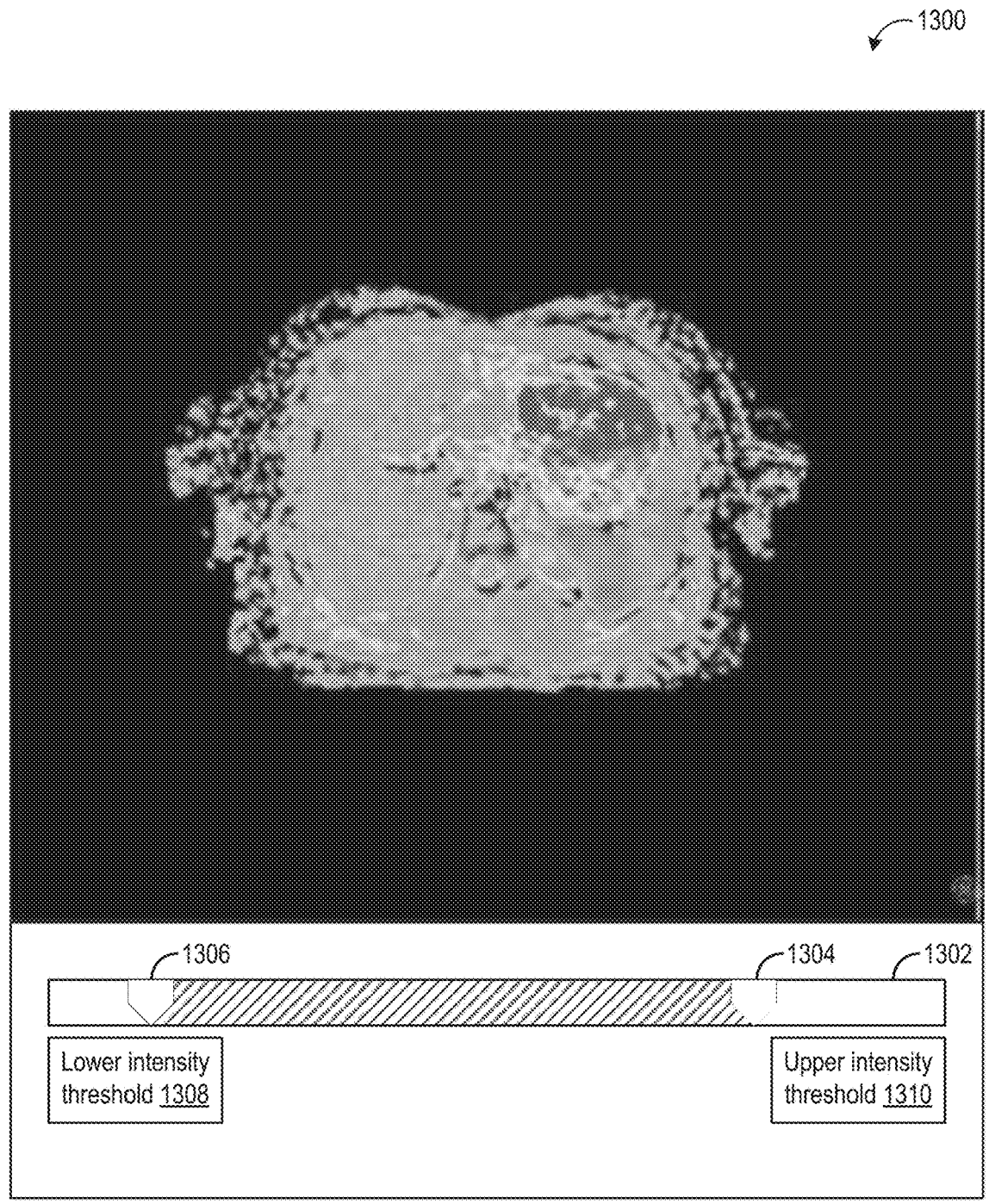
FIG. 13 shows a graphical user interface comprising an intensity threshold control interface, in accordance with an exemplary embodiment.

Examples of foreground and background in MR images are illustrated in FIG. 7 (abdomen MR image) and FIG. 8 (brain MR image). FIGS. 9 and 10 show a comparison between segmentation maps generated by hand (i.e., ground truth masks) and segmentation maps generated by trained neural network according to embodiments of the current disclosure, for abdomen and brain MR images, respectively. FIGS. 9 and 10 also show MR images (of either abdomen or brain) treated with fixed intensity thresholds compared to MR images processed according to noise reduction methods herein disclosed. FIGS. 11 and 12 show how MR image contrast and brightness may be enhanced in MR images with background noise reduced according to embodiments of the current disclosure compared to MR images with background noise reduced according to conventional fixed threshold methods. FIG. 13 shows an example graphical user interface 1300, wherein an intensity threshold control interface is shown, enabling user selection of a background intensity threshold.

In this way, background noise of an MR image/map may be reduced to a greater extent than may be achieved using a fixed intensity threshold, without loss of anatomical detail in the foreground of the MR image. Further, background details may be recovered by adjusting a background intensity threshold via an intensity threshold control interface.

FIG. 1 illustrates an MRI system 10 that includes a magnetostatic field magnet unit 12, a gradient coil unit 13, an RF coil unit 14, an RF body or volume coil unit 15, a transmit/receive (T/R) switch 20, an RF driver unit 22, a gradient coil driver unit 23, a data acquisition unit 24, a controller unit 25, a patient table or bed 26, an image processing system 31, a user input device 32, and a display device 33. In some embodiments, the RF coil unit 14 is a surface coil, which is a local coil typically placed proximate to the anatomy of interest of a subject 16. Herein, the RF body coil unit 15 is a transmit coil that transmits RF signals, and the local surface RF coil unit 14 receives the MR signals. As such, the transmit body coil (e.g., RF body coil unit 15) and the surface receive coil (e.g., RF coil unit 14) are separate but electromagnetically coupled components. The MRI system 10 transmits electromagnetic pulse signals to the subject 16 placed in an imaging space 18 with a static magnetic field formed to perform a scan for obtaining magnetic resonance signals from the subject 16. One or more MR images of the subject 16 can be reconstructed based on the magnetic resonance signals thus obtained by the scan. The scanned space, however, generally includes non-anatomical features/structures, such as air, which may produce background signal, which may obscure the anatomical features/structures of interest.

The magnetostatic field magnet unit 12 includes, for example, an annular superconducting magnet, which is mounted within a toroidal vacuum vessel. The magnet defines a cylindrical space surrounding the subject 16 and generates a constant primary magnetostatic field $B_0$.

The MM system 10 also includes a gradient coil unit 13 that forms a gradient magnetic field in the imaging space 18 so as to provide the magnetic resonance signals received by the RF coil arrays with three-dimensional positional information. The gradient coil unit 13 includes three gradient coil systems, each of which generates a gradient magnetic field along one of three spatial axes perpendicular to each other, and generates a gradient field in each of a frequency encoding direction, a phase encoding direction, and a slice selection direction in accordance with the imaging condition. More specifically, the gradient coil unit 13 applies a gradient field in the slice selection direction (or scan direction) of the subject 16, to select the slice; and the RF body coil unit 15 or the local RF coil arrays may transmit an RF pulse to a selected slice of the subject 16. The gradient coil unit 13 also applies a gradient field in the phase encoding direction of the subject 16 to phase encode the magnetic resonance signals from the slice excited by the RF pulse. The gradient coil unit 13 then applies a gradient field in the frequency encoding direction of the subject 16 to frequency encode the magnetic resonance signals from the slice excited by the RF pulse.

The RF coil unit 14 is disposed, for example, to enclose the region to be imaged of the subject 16. In some examples, the RF coil unit 14 may be referred to as the surface coil or the receive coil. In the static magnetic field space or imaging space 18 where a static magnetic field $B_0$ is formed by the magnetostatic field magnet unit 12, the RF coil unit 15 transmits, based on a control signal from the controller unit 25, an RF pulse that is an electromagnet wave to the subject 16 and thereby generates a high-frequency magnetic field $B_1$. This excites a spin of protons in the slice to be imaged of the subject 16. The RF coil unit 14 receives, as a magnetic resonance signal, the electromagnetic wave generated when the proton spin thus excited in the slice to be imaged of the subject 16 returns into alignment with the initial magnetization vector. In some embodiments, the RF coil unit 14 may transmit the RF pulse and receive the MR signal. In other embodiments, the RF coil unit 14 may only be used for receiving the MR signals, but not transmitting the RF pulse.

The RF body coil unit 15 is disposed, for example, to enclose the imaging space 18, and produces RF magnetic field pulses orthogonal to the main magnetic field $B_0$ produced by the magnetostatic field magnet unit 12 within the imaging space 18 to excite the nuclei. In contrast to the RF coil unit 14, which may be disconnected from the MM system 10 and replaced with another RF coil unit, the RF body coil unit 15 is fixedly attached and connected to the MRI system 10. Furthermore, whereas local coils such as the RF coil unit 14 can transmit to or receive signals from only a localized region of the subject 16, the RF body coil unit 15 generally has a larger coverage area. The RF body coil unit 15 may be used to transmit or receive signals to the whole body of the subject 16, for example. Using receive-only local coils and transmit body coils provides a uniform RF excitation and good image uniformity at the expense of high RF power deposited in the subject. For a transmit-receive local coil, the local coil provides the RF excitation to the region of interest and receives the MR signal, thereby decreasing the RF power deposited in the subject. It should be appreciated that the particular use of the RF coil unit 14 and/or the RF body coil unit 15 depends on the imaging application.

The T/R switch 20 can selectively electrically connect the RF body coil unit 15 to the data acquisition unit 24 when operating in receive mode, and to the RF driver unit 22 when operating in transmit mode. Similarly, the T/R switch 20 can selectively electrically connect the RF coil unit 14 to the data acquisition unit 24 when the RF coil unit 14 operates in receive mode, and to the RF driver unit 22 when operating in transmit mode. When the RF coil unit 14 and the RF body coil unit 15 are both used in a single scan, for example if the RF coil unit 14 is configured to receive MR signals and the RF body coil unit 15 is configured to transmit RF signals, then the T/R switch 20 may direct control signals from the RF driver unit 22 to the RF body coil unit 15 while directing received MR signals from the RF coil unit 14 to the data acquisition unit 24. The coils of the RF body coil unit 15 may be configured to operate in a transmit-only mode or a transmit-receive mode. The coils of the local RF coil unit 14 may be configured to operate in a transmit-receive mode or a receive-only mode.

The RF driver unit 22 includes a gate modulator (not shown), an RF power amplifier (not shown), and an RF oscillator (not shown) that are used to drive the RF coils (e.g., RF coil unit 15) and form a high-frequency magnetic field in the imaging space 18. The RF driver unit 22 modulates, based on a control signal from the controller unit 25 and using the gate modulator, the RF signal received from the RF oscillator into a signal of predetermined timing having a predetermined envelope. The RF signal modulated by the gate modulator is amplified by the RF power amplifier and then output to the RF coil unit 15.

The gradient coil driver unit 23 drives the gradient coil unit 13 based on a control signal from the controller unit 25 and thereby generates a gradient magnetic field in the imaging space 18. The gradient coil driver unit 23 includes three systems of driver circuits (not shown) corresponding to the three gradient coil systems included in the gradient coil unit 13.

The data acquisition unit 24 includes a pre-amplifier (not shown), a phase detector (not shown), and an analog/digital converter (not shown) used to acquire the magnetic resonance signals received by the RF coil unit 14. In the data acquisition unit 24, the phase detector phase detects, using the output from the RF oscillator of the RF driver unit 22 as a reference signal, the magnetic resonance signals received from the RF coil unit 14 and amplified by the pre-amplifier, and outputs the phase-detected analog magnetic resonance signals to the analog/digital converter for conversion into digital signals. The digital signals thus obtained are output to the image processing system 31.

The MRI system 10 includes a table 26 for placing the subject 16 thereon. The subject 16 may be moved inside and outside the imaging space 18 by moving the table 26 based on control signals from the controller unit 25.

The controller unit 25 includes a computer and a recording medium on which a program to be executed by the computer is recorded. The program when executed by the computer causes various parts of the system to carry out operations corresponding to pre-determined scanning. The recording medium may comprise, for example, a ROM, flexible disk, hard disk, optical disk, magneto-optical disk, CD-ROM, or non-transitory memory card. The controller unit 25 is connected to the user input device 32 and processes the operation signals input to the user input device 32 and furthermore controls the table 26, RF driver unit 22, gradient coil driver unit 23, and data acquisition unit 24 by outputting control signals to them. The controller unit 25 also controls, to obtain a desired image, the image processing system 31 and the display device 33 based on operation signals received from the user input device 32.

The user input device 32 includes user input devices such as a touchscreen, keyboard and a mouse. The user input device 32 is used by an operator, for example, to input such data as an imaging protocol and to set a region where an imaging sequence is to be executed. The data about the imaging protocol and the imaging sequence execution region are output to the controller unit 25.

The image processing system 31 includes a processor and non-transitory memory on which machine executable instructions may be stored, wherein the machine executable instructions may enable the processor to execute one or more of the steps of one or more of the methods herein disclosed. The image processing system 31 may be connected to the controller unit 25 and may perform data processing based on control signals received from the controller unit 25 or user input device 32. The image processing system 31 is also connected to the data acquisition unit 24 and generates spectrum data by applying various image processing operations to the magnetic resonance signals output from the data acquisition unit 24.

The image processing system 31 may perform background noise reduction in MR images produced by MM system 10. In one example, image processing unit 31 may execute a method, such as method 400 or 600 (discussed in detail below), to segment an MR image into a foreground and background using, for example, a neural network, and apply an intensity threshold to either the background or foreground. Image processing system 31 may thereby produce noise reduced MR images, and may display the noise reduced MR images via display device 33.

The display device 33 displays an image on the display screen of the display device based on control signals received from the controller unit 25. The display device 33 displays, for example, a noise reduced MR image produced by the image processing system 31. Display device 33 may comprise a graphical user interface, wherein a user may interact with/input/alter one or more data fields via user input device 32. The display device 33 may display a two-dimensional (2D) slice image or three-dimensional (3D) image of the subject 16 generated by the image processing system 31, wherein background noise of the 2D or 3D image may be reduced according to one or more methods executed by image processing system 31.

During a scan, RF coil array interfacing cables (not shown in FIG. 1) may be used to transmit signals between the RF coils (e.g., RF coil unit 14 and RF body coil unit 15) and other aspects of the processing system (e.g., data acquisition unit 24, controller unit 25, and so on), for example to control the RF coils and/or to receive information from the RF coils. As explained previously, the RF body coil unit 15 is a transmit coil that transmits RF signals, and the local surface RF coil unit 14 receives the MR signals. More generally, RF coils are used to transmit RF excitation signals ("transmit coil"), and to receive the MR signals emitted by an imaging subject ("receive coil"). In some embodiments, the transmit and receive coils are a single mechanical and electrical structure or array of structures, with transmit/receive mode switchable by auxiliary circuitry. In other examples, the transmit body coil (e.g., RF body coil unit 15) and the surface receive coil (e.g., RF coil unit 14) may comprise separate components. For enhanced image quality, however, it may be desirable to provide a receive coil that is mechanically and electrically isolated from the transmit coil. In such case it is desirable that the receive coil, in its receive mode, be electromagnetically coupled to and resonant with an RF "echo" that is stimulated by the transmit coil.

Figure 2:
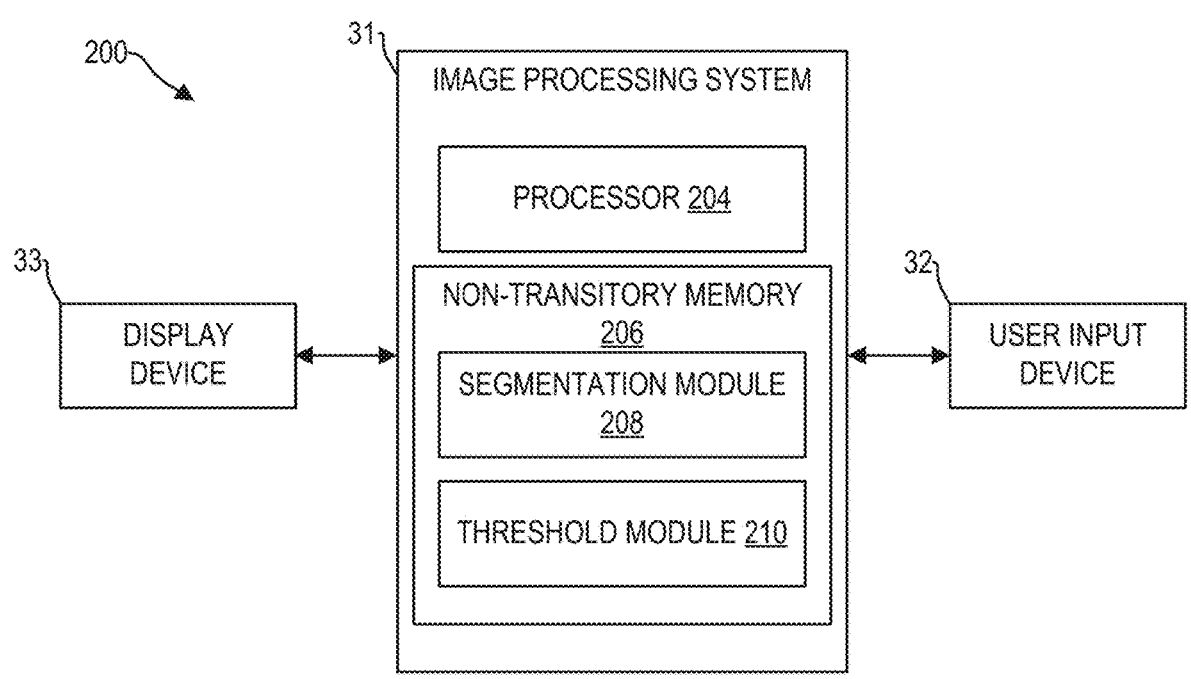
FIG. 2 shows an exemplary embodiment of an image processing system for processing MR images and/or parametric maps.

Referring to FIG. 2, MR image processing system 200 is shown, in accordance with an exemplary embodiment. In some embodiments, MR image processing system 200 is incorporated into the MM system. In some embodiments, MR image processing 200 is disposed at a device (e.g., edge device, server, etc.) communicably coupled to the MM system via wired and/or wireless connections. In some embodiments, MR image processing system 200 is disposed at a separate device (e.g., a workstation) which can receive images/maps from the MM system or from a storage device which stores the images/maps generated by the MM system. MR image processing system 200 may comprise image processing system 31, user input device 32, and display device 33.

Image processing system 31 includes a processor 204 configured to execute machine readable instructions stored in non-transitory memory 206. Processor 204 may be single core or multi-core, and the programs executed thereon may be configured for parallel or distributed processing. In some embodiments, the processor 204 may optionally include individual components that are distributed throughout two or more devices, which may be remotely located and/or configured for coordinated processing. In some embodiments, one or more aspects of the processor 204 may be virtualized and executed by remotely-accessible networked computing devices configured in a cloud computing configuration.

Non-transitory memory 206 may comprise segmentation module 208 and threshold module 210. Segmentation module 208 includes instructions for segmenting an MR image and/or parametric image into foreground and background. In some embodiments, segmentation instructions implement analytical approaches such as clustering, region growing, edge detection, etc. In some embodiments, segmentation module 208 implements a trained neural network for segmenting MR images/maps. For example, segmentation module 208 may store instructions for implementing a neural network, such as the CNN of CNN architecture 300, and/or routines/methods for initializing, training, and adjusting parameters of the neural network. Segmentation module 208 may include trained and/or untrained neural network and may further include various data, such as training data, training routines, or parameters (e.g., weights and biases), associated with one or more neural network models stored therein.

Non-transitory memory 206 further includes threshold module 210. Threshold module 210 may include instructions for determining and applying an intensity threshold. In some embodiments, threshold module 210 includes instructions for determining an Otsu threshold for a received MR image and/or parametric map, based on the Otsu threshold equation. In some embodiments, threshold module 210 may use the segmentation map determined by segmentation module 208 to calculate a highest intensity among background pixels/voxels.

In some embodiments, the non-transitory memory 206 may include components disposed at two or more devices, which may be remotely located and/or configured for coordinated processing. In some embodiments, one or more aspects of the non-transitory memory 206 may include remotely-accessible networked storage devices configured in a cloud computing configuration.

Image processing system 200 may further include user input device 32. User input device 32 may comprise one or more of a touchscreen, a keyboard, a mouse, a trackpad, a motion sensing camera, or other device configured to enable a user to interact with and manipulate data within image processing system 31. In one example, user input device 32 may enable a user to make a selection of an intensity threshold, or intensity range, such as by interacting with an intensity threshold control interface which may be displayed via display device 33.

Display device 33 may include one or more display devices utilizing virtually any type of technology. In some embodiments, display device 33 may comprise a computer monitor, and may display unprocessed and processed MR images and/or parametric maps, along with an intensity threshold control interface (such as intensity threshold control interface 1300 shown in FIG. 13). Display device 33 may be combined with processor 204, non-transitory memory 206, and/or user input device 32 in a shared enclosure, or may be peripheral display devices and may comprise a monitor, touchscreen, projector, or other display device known in the art, which may enable a user to view MR images produced by an MRI system, and/or interact with various data stored in non-transitory memory 206.

It should be understood that image processing system 200 shown in FIG. 2 is for illustration, not for limitation. Another appropriate image processing system may include more, fewer, or different components.

Turning to FIG. 3, CNN architecture 300 for segmenting MR images/maps is shown, in accordance with an exemplary embodiment. CNN architecture 300 represents a U-net architecture, which is configured to receive an input MR image/map comprising a plurality of pixels/voxels, and segment the image/map into foreground and background by classifying each pixel/voxel of the plurality of pixels/voxels of the input MR image/map as either foreground or background. CNN architecture 300 includes a series of mappings, from an input image 302 which may be received by an input layer, through a plurality of feature maps, and finally to an output segmentation map 356 which may be produced by an output layer.

The various elements comprising CNN architecture 300 are labeled in legend 358. As indicated by legend 358, CNN architecture 300 includes a plurality of feature maps (and/or copied feature maps), wherein each feature map may receive input from either an external file, or a previous feature map, and may transform/map the received input to output to produce a next feature map. Each feature map may comprise a plurality of neurons, where in some embodiments, each neuron may receive input from a finite number of neurons of a previous layer/feature map, and may compute a single output based on the received inputs. A feature map may be described using spatial dimensions, such as length, width, and depth, wherein the dimensions refer to the number of neurons comprising the feature map (e.g., how many neurons long, how many neurons wide, and how many neurons deep, a specified feature map is).

In some embodiments, the neurons of the feature maps may compute an output by performing a dot product of received inputs using a set of learned weights (each set of learned weights may herein be referred to as a filter), wherein each received input has a unique corresponding learned weight, wherein the learned weight was learned during training of the CNN.

The transformations/mappings performed by each feature map are indicated by arrows, wherein each type of arrow corresponds to a unique transformation, as indicated by legend 358. Rightward pointing solid black arrows indicate 3×3 convolutions, wherein output from a 3×3 grid of feature channels of an immediately preceding feature map are mapped to a single feature channel of a current feature map. Downward pointing arrows indicate 2×2 max pooling, wherein the max value from a 2×2 grid of feature channels is propagated from an immediately preceding feature map to a single feature channel of a current feature map, thereby resulting in a 2-fold reduction in spatial resolution of the immediately preceding feature map. Upward pointing arrows indicate 2×2 up convolutions, which comprise mapping output from a single feature channel of an immediately preceding feature map to a 2×2 grid of feature channels in a current feature map, thereby increasing the spatial resolution of the immediately preceding feature map by 2-fold. Rightward pointing dash-tailed arrows indicate copying and cropping an immediately preceding feature map for use in a current feature map. Cropping enables the dimensions of the copied feature map to match the dimensions of the feature channel with which the copied feature map is to be concatenated. Rightward pointing arrows with hollow heads indicate a 1×1 convolution, in which each feature channel in an immediately preceding feature map is mapped to a single feature channel of a current feature map, or in other words, wherein a 1-to-1 mapping of feature channels between an immediately preceding feature map and a current feature map occurs. Processing at every feature map may include the above-described convolutions as well as activations, where activation mappings are non-linear functions that restrict the output values of the processing to a bounding range.

In addition to the operations indicated by the arrows within legend 358, CNN architecture 300 includes solid filled rectangles corresponding to feature maps, wherein feature maps comprise a height (top to bottom length as shown in FIG. 3, corresponds to a y spatial dimension in an x-y plane), width (not shown in FIG. 3, assumed equal in magnitude to height, corresponds to an x spatial dimension in an x-y plane), and depth (a left-right length as shown in FIG. 3, corresponds to the number of features within each feature channel). Likewise, CNN architecture 300 includes hollow (unfilled) rectangles, corresponding to copied and cropped feature maps, wherein copied feature maps comprise height (top to bottom length as shown in FIG. 3, corresponds to a y spatial dimension in an x-y plane), width (not shown in FIG. 3, assumed equal in magnitude to height, corresponds to an x spatial dimension in an x-y plane), and depth (a length from a left side to a right side as shown in FIG. 3, corresponds to the number of features within each feature channel).

Starting at input image tile 302 (herein also referred to as an input layer), data corresponding to an MR image or parametric map may be input and mapped to a first set of features. In some embodiments, the input data corresponds to an MR image with certain type of contrast, such as functional MRI (fMRI), perfusion-weighted image (PWI), diffusion weighted image (DWI), and so on. In some embodiments, the input data corresponds an MR parametric map, such as an apparent diffusion coefficient map (ADC) map which reflects the magnitude of diffusion. The input data may correspond to two-dimensional (2D) or three-dimensional (3D) MR image/map. In some embodiments, the input data is pre-processed (e.g., normalized) before being processed by the neural network.

Take a specific configuration as an example for the purpose of illustration. Input image tile 302 includes a feature map comprising 572λ572 channels, corresponding to an input image comprising 572×572 pixels, wherein a 1-to-1 correspondence between feature channels and pixels exists. Each of the 572×572 channels may comprise a plurality of features corresponding to the 572×572 pixels of the input image. In some embodiments, each of the 572×572 channels may include three features, wherein each feature may correspond to a color intensity of a color, such as in an RGB pixel color model. In some embodiments, each of the 572×572 channels includes a single feature per feature channel, wherein the single feature corresponds to a monochrome intensity of each pixel, such as according to a greyscale/black-and-white color scheme.

As indicated by the solid black rightward pointing arrow immediately to the right of input image tile 302, a 3×3 convolution of the feature channels of input image tile 302 is performed to produce feature map 304. As discussed above, a 3×3 convolution includes mapping input from a 3×3 grid of feature channels to a single feature channel of a current feature map, using learned weights. In CNN architecture 300, the single feature per channel of input image tile 302 is used to produce 64 features per channel in feature map 304, wherein for each 3×3 grid of feature channels in input image tile 302, 64 distinct sets of weights (herein also referred as filters) are applied to generate the 64 features per feature channel of feature map 304. The increase in features per feature channel is indicated by an increase in the left-right width of feature map 304 compared to input image tile 302. The 3×3 convolutions of CNN architecture 300 comprise step sizes of 1, and therefore result in a loss of a 1 pixel border from the input image for each 3×3 convolution applied. Therefore, feature map 304 includes 570×570 feature channels (that is, two feature channels are lost in the x dimension and two feature channels are lost in the y dimension).

Feature map 304 includes 570×570 channels with 64 features per channel. As indicated by the solid black rightward pointing arrow immediately to the right of feature map 304, a 3×3 convolution is performed on feature map 304 to produce feature map 306.

Feature map 306 includes 568×568 channels with 64 features per channel. As indicated by the downward pointing arrow beneath feature map 306, a 2×2 max pooling operation is performed on feature map 306 to produce feature map 308. Briefly, a 2×2 max pooling operation includes determining a max feature value from a 2×2 grid of feature channels of an immediately preceding feature map, and setting a single feature, in a single feature channel, of a current feature map, to the max value so determined. The 2×2 max pooling employed herein includes a step size of 2. 2×2 max pooling thereby combines output from 4 feature channels (2 in the x dimension and 2 in the y dimension) to produce a reduced resolution feature map (the output feature map will comprise half the number of feature channels in the x direction and half the number of feature channels in the y direction, or said another way, the output feature map will comprise one fourth the number of feature channels of the input feature map). 2×2 max pooling does not alter the number of features per channel, as corresponding features between feature channels are combined, but features within a single feature channel are not combined. Additionally, feature map 306 is cropped, copied, and concatenated with output from feature map 348 to produce feature map 350, as indicated by the dash-tailed rightward pointing arrow immediately to the right of feature map 306.

Feature map 308 includes 284×284 channels (half the resolution of feature map 306, due to the 2×2 max pooling) with 64 features per channel. As indicated by the solid black rightward pointing arrow immediately to the right of feature map 308, a 3×3 convolution is performed on feature map 308 to produce feature map 310.

Feature map 310 includes 282×282 channels with 128 features per channel. As indicated by the solid black rightward pointing arrow immediately to the right of feature map 310, a 3×3 convolution is performed on feature map 310 to produce feature map 312.

Feature map 312 includes 280×280 channels with 128 features per channel. As indicated by the downward pointing arrow beneath feature map 312, a 2×2 max pooling operation is performed on feature map 312 to produce feature map 314, wherein feature map 314 is of half the spatial resolution of feature map 312. Additionally, feature map 312 is cropped, copied, and concatenated with output from feature map 342 to produce feature map 344, as indicated by the dash-tailed rightward pointing arrow immediately to the right of feature map 312.

Feature map 314 includes 140×40 channels with 128 features per channel. As indicated by the solid black rightward pointing arrow immediately to the right of feature map 314, a 3×3 convolution is performed on feature map 314 to produce feature map 316.

Feature map 316 includes 138×138 channels with 256 features per channel. As indicated by the solid black rightward pointing arrow immediately to the right of feature map 316, a 3×3 convolution is performed on feature map 316 to produce feature map 318.

Feature map 318 includes 136×136 channels with 256 features per channel. As indicated by the downward pointing arrow beneath feature map 318, a 2×2 max pooling operation is performed on feature map 318 to produce feature map 320, wherein feature map 320 is of half the spatial resolution of feature map 318. Additionally, feature map 318 is cropped, copied, and concatenated with output from feature map 336 to produce feature map 338, as indicated by the dash-tailed rightward pointing arrow immediately to the right of feature map 318.

Feature map 320 includes 68×68 channels with 256 features per channel. As indicated by the solid black rightward pointing arrow immediately to the right of feature map 320, a 3×3 convolution is performed on feature map 320 to produce feature map 322.

Feature map 322 includes 66×66 channels with 512 features per channel. As indicated by the solid black rightward pointing arrow immediately to the right of feature map 322, a 3×3 convolution is performed on feature map 322 to produce feature map 324.

Feature map 324 includes 64×64 channels with 512 features per channel. As indicated by the downward pointing arrow beneath feature map 324, a 2×2 max pooling operation is performed on feature map 324 to produce feature map 326, wherein feature map 326 is of half the spatial resolution of feature map 324. Additionally, feature map 324 is cropped, copied, and concatenated with output from feature map 330 to produce feature map 332, as indicated by the dash-tailed rightward pointing arrow immediately to the right of feature map 324.

Feature map 326 includes 32×32 channels with 512 features per channel. As indicated by the solid black rightward pointing arrow immediately to the right of feature map 326, a 3×3 convolution is performed on feature map 326 to produce feature map 328.

Feature map 328 includes 30×30 channels with 1024 features per channel. As indicated by the solid black rightward pointing arrow immediately to the right of feature map 328, a 3×3 convolution is performed on feature map 328 to produce feature map 330.

Feature map 330 includes 28×28 channels with 1024 features per channel. As indicated by the upward pointing arrow immediately above feature map 330, a 2×2 up convolution is performed on feature map 330 to produce a first half of feature map 332, while copied and cropped features from feature map 324 are used to produce a second half of feature map 332. Briefly, a 2×2 up convolution (herein with step size of 2) includes mapping a feature in a single feature channel of an immediately preceding feature map to four features distributed amongst four feature channels in a current feature map (that is, output from a single feature channel is taken as input by four feature channels).

Feature map 332 includes 56×56 channels with 1024 features per channel. As indicated by the solid black rightward pointing arrow immediately to the right of feature map 332, a 3×3 convolution is performed on feature map 332 to produce feature map 334.

Feature map 334 includes 54×54 channels with 512 features per channel. As indicated by the solid black rightward pointing arrow immediately to the right of feature map 334, a 3×3 convolution is performed on feature map 334 to produce feature map 336.

Feature map 336 includes 52×52 channels with 512 features per channel. As indicated by the upward pointing arrow immediately above feature map 336, a 2×2 up convolution is performed on feature map 336 to produce half of feature map 338, while copied and cropped features from feature map 318 produce the second half of feature map 338.

Feature map 338 includes 104×104 channels with 512 features per channel. As indicated by the solid black rightward pointing arrow immediately to the right of feature map 338, a 3×3 convolution is performed on feature map 338 to produce feature map 340.

Feature map 340 includes 102×102 channels with 256 features per channel. As indicated by the solid black rightward pointing arrow immediately to the right of feature map 340, a 3×3 convolution is performed on feature map 340 to produce feature map 342.

Feature map 342 includes 100×100 channels with 256 features per channel. As indicated by the upward pointing arrow immediately above feature map 342, a 2×2 up convolution is performed on feature map 342 to produce a first half of feature map 344, while copied and cropped features from feature map 312 are used to produce the second half of feature map 344.

Feature map 344 includes 200×200 channels with 256 features per channel. As indicated by the solid black rightward pointing arrow immediately to the right of feature map 344, a 3×3 convolution is performed on feature map 344 to produce feature map 346.

Feature map 346 includes 198×198 channels with 128 features per channel. As indicated by the solid black rightward pointing arrow immediately to the right of feature map 346, a 3×3 convolution is performed on feature map 346 to produce feature map 348.

Feature map 348 includes 196×196 channels with 128 features per channel. As indicated by the upward pointing arrow immediately above feature map 348, a 2×2 up convolution is performed on feature map 348 to produce a first half of feature map 350, while copied and cropped features from feature map 306 are used to produce the second half of feature map 350.

Feature map 350 includes 392×392 channels with 128 features per channel. As indicated by the solid black rightward pointing arrow immediately to the right of feature map 350, a 3×3 convolution is performed on feature map 350 to produce feature map 352.

Feature map 352 includes 390×390 channels with 64 features per channel. As indicated by the solid black rightward pointing arrow immediately to the right of feature map 352, a 3×3 convolution is performed on feature map 352 to produce feature map 354.

Feature map 354 includes 388×388 channels with 64 features per channel. As indicated by the hollow headed rightward pointing arrow immediately to the right of feature map 354, a 1×1 convolution is performed on feature map 354 to produce feature map 356. Briefly, a 1×1 convolution includes a 1-to-1 mapping of feature channels in a first feature space to feature channels in a second feature space, wherein no reduction in spatial resolution occurs.

Feature map 356 includes 388×388 channels with 2 features per channel. The 2 features per channel in feature map 356 correspond to the categories of background and foreground, and the 388×388 channels correspond to a 388×388 pixel segmentation map. The series of 3×3 convolutions therefore results in a reduction of resolution of the input MR image from 572×572 pixels to an output segmentation map of 388×388 pixels. Feature map 356 may comprise an output layer of neurons, wherein each neuron may correspond to a pixel of a segmentation map, and wherein output of each neuron may correspond to the binary classification scheme, and may therefore indicate if a given pixel corresponds to background or foreground of the input MR image or parametric map.

In this way, CNN architecture 300 may enable segmentation/classification of a plurality of pixels/voxels of an MR image or a parametric map. In one example, CNN architecture 300 may enable mapping of one or more features of a pixel/voxel of an MR image/map to a binary space, wherein the binary space includes a first classification and a second classification. In one example, the first classification may correspond to foreground, and the second classification may correspond to background. CNN architecture 300 illustrates the feature map transformations which occur as an input image tile is propagated through the neuron layers of the convolutional neural network, to produce a segmentation map of the input image as output. In one example, architecture 300 may enable mapping of a plurality of pixel/voxel intensity values to a binary segmentation map, wherein each pixel intensity value may be uniquely mapped (classified) to either foreground or background. In another example, the segmentation map may comprise a binary mask, comprising a matrix of values, wherein each of the values of the matrix may be one of a one or a zero, and wherein each pixel/voxel classified as background corresponds to a matrix value of zero, and each pixel/voxel classified as foreground may have a corresponding matrix value of one.

The weights (and biases) of the convolutional layers in the neural network 300 are learned during training. More specifically, a loss function is defined to reflect the difference between the segmentation/classification mask output by the neural network 300 and a corresponding ground truth mask. The ground truth mask may be, for example, manually generated by a series of thresholding and other image processing operations. In some embodiments, the loss function is a DICE coefficient:

$$\text{DICE} = (S \cap T)/(S \cup T),$$

wherein S is the ground truth space and T is the neural network output space. The loss may be back projected to the neural network to update the weights (and biases) of the convolutional layers. A plurality pairs of input MR images/ maps and corresponding ground truth masks may be used to train the neural network 300.

It should be understood that the architecture and configuration of CNN 300 shown in FIG. 3 is for illustration, not for limitation. Any appropriate neural network can be used herein for segmenting MR images/maps, such as ResNet, autoencoder, recurrent neural networks, General Regression Neural Network (GRNN), etc.

Figure 4:
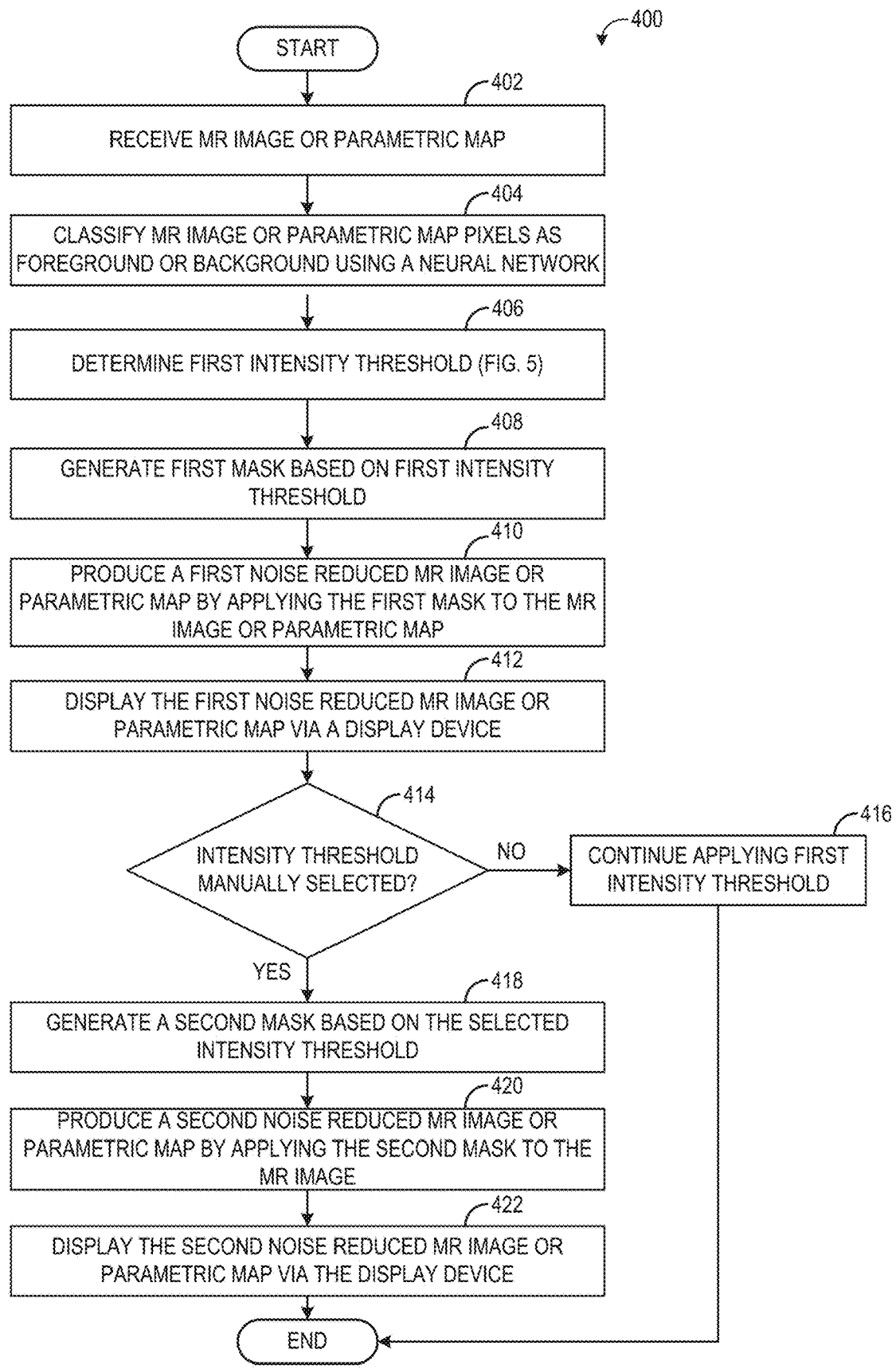
FIG. 4 shows a high level flowchart of a method for reducing background noise in MR images and/or parametric maps, in accordance with an exemplary embodiment.

Turning to FIG. 4, a method 400 for reducing background noise in an MR image or parametric map is shown, in accordance with an exemplary embodiment. Method 400 may be executed by an image processing system, such as image processing system 200.

Method 400 begins at 402, where the image processing system receives an MR image or parametric map. In some embodiments, the image processing system may receive an MR image/map from an MM system or from a storage device which stores the MR image/map generated by the MRI system.

At 404, the MR image/map is segmented as foreground which is a region of anatomy of interest and background which is outside of the region of anatomy of interest. In some embodiments, the segmentation is achieved by analytical methods, such as clustering, region growing, edge detection, etc. In some embodiments, a trained neural network is used to segment the MR image/map. For example, each pixel/voxel of the MR image/map received at 402 may be classified as belonging to either the foreground or the background based on an output from a convolutional neural network. In some embodiments, the neural network generates a segmentation/classification map for the MR image/map, wherein the map is a matrix with values being either one (1) or zero (0), and wherein each pixel/voxel classified as background corresponds to a matrix value of zero, and each pixel/voxel classified as foreground corresponds to a matrix value of one.

At 406, a first intensity threshold is determined. Method 500 discusses the process of determining the first intensity threshold in more detail. In some embodiments, the intensity threshold is calculated based on an intensity distribution of the received MR image/map according to Otsu's method. In some embodiments, the intensity threshold may be selected based on the intensity of the pixels/voxels classified as background at 404 of method 400. As a more specific example, step 406 may comprise determining a maximum pixel/voxel intensity of the background, and setting the intensity threshold to the determined maximum background intensity.

At 408, a first mask is generated based on the first intensity threshold. In some embodiments, generating the first mask may comprise comparing a pixel/voxel intensity of each background pixel/voxel with the first intensity threshold, and responsive to the intensity being lower than the first intensity threshold, setting a mask value corresponding to the pixel/voxel to zero, or otherwise setting the mask value corresponding to the pixel to one. Mask values corresponding to foreground pixels/voxels are set to one.

At 410, a first noise reduced MR image/map is produced by applying the first mask to the MR image/map. In some embodiments, applying the first mask to the MR image/map may comprise multiplying the intensity of each pixel/voxel of the MR image by the corresponding mask value in the first mask. The mask values comprise either 1 or 0, where background pixels/voxels having an intensity less than the first intensity threshold have corresponding mask values of zero (and therefore the intensity of such pixels in the noise reduced MR image is zero) and all other pixels/voxels of the MR image/map have corresponding mask values of 1 (and therefore maintain their pixel intensity in the noise reduced MR image at the same level as in the MR image).

At 412, the first noise reduced MR image is displayed via a display device, such as display device 33. Step 412 may further comprise displaying an intensity threshold control interface along with the noise reduced MR image, such as intensity threshold control interface 1300 shown in FIG. 13, which may enable a user to manually select an intensity threshold to apply to the background.

At 414, it is determined if the user has manually selected an intensity threshold via the intensity threshold control interface. If at 414 it is determined that the user has not selected an intensity threshold via the intensity threshold control interface, method 400 continues to apply the first intensity threshold, as indicated by step 416, and method 400 may then end. However, if at 414 it is determined that the user has selected an intensity threshold via the intensity threshold control interface, method 400 proceeds to 418.

At 418, a second mask is generated based on the user selected intensity threshold. The second mask may suppress output of pixels/voxels (e.g., in the background) with an intensity below the user selected intensity threshold. In some embodiments, the mask may comprise a matrix of values corresponding to a matrix of pixels/voxels comprising an MR image/map, wherein each pixel/voxel to be surpassed corresponds to a mask value of one in the matrix of values, and wherein each pixel/voxel to be repressed corresponds to a mask value of zero in the matrix of values.

At 420, a second noise reduced MR image is produced by applying the second mask to the MR image. In some embodiments, producing the second noise reduced MR image by applying the second mask to the MR image includes multiplying each pixel/voxel intensity in a MR image/map by a corresponding mask value, and setting a pixel/voxel intensity in the noise reduced MR image/map (corresponding to the pixel/voxel in the MR image/map) to the product of the original pixel intensity and the mask value. In this way, the intensity of each pixel/voxel to be suppressed in the noise reduced MR image may be multiplied by zero, producing a pixel intensity of zero in the noise reduced MR image.

At step 422, the second noise reduced MR image is displayed via a display device. Method 400 may then end.

In this way, method 400 may enable selective noise reduction in those regions indicated as corresponding to background, and not to foreground, wherein the foreground may correspond to anatomical regions of interest. As the MR image is first segmented into foreground and background, and the intensity threshold is applied to the background and not the foreground, method 400 may mitigate formation of holes in regions of the foreground, which may occur when portions of the foreground have intensity lower than the intensity threshold.

It should be understood that the method 400 as shown in FIG. 4 is for illustration, not for limitation. A method for suppressing background according to this disclosure may include more, fewer, and/or different operations. For example, a method may not include operations 416 through 422, i.e., does not require user's interaction.

In method 400, background suppression in an MR parametric map is done by directly segmenting the parametric map into foreground and background and applying the intensity threshold to the background and not the foreground of the map. In some alternative embodiments, the MR image (e.g., DWI) is segmented into foreground and background and the first (or second) mask is generated based on the segmentation of the MR image and the first (or second) intensity threshold. Then the first (or second) mask is applied to the corresponding parametric map (e.g., ADC map) to suppress background in the parametric map. In other alternative embodiments, the MR image (e.g., DWI) is segmented into foreground and background. The first (or second) mask is generated based on the segmentation of the MR image and the first (or second) intensity threshold and applied to the MR image to produce noised reduced MR image. Then the noise reduced MR image is transformed to a noise reduced parametric map (e.g., ADC map) through methods known in the art.

Figure 5:
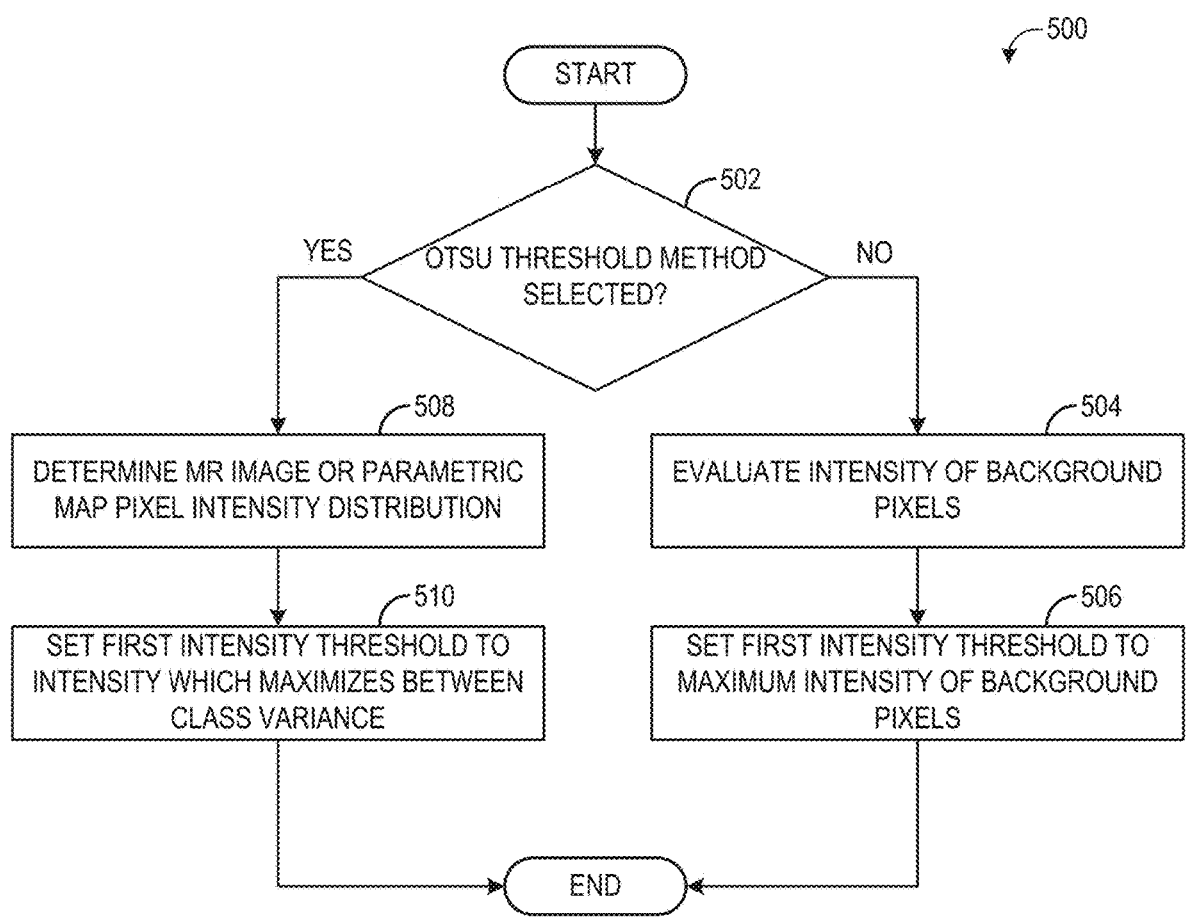
FIG. 5 shows a flowchart of an example method for determining an intensity threshold.

Turning to FIG. 5, an example method 500 for determining an intensity threshold based on a received MR image/map is shown. Method 500 may be executed by an image processing system, such as image processing system 200.

Method 500 begins at 502, where it is determined if an Otsu threshold method has been selected. In one example, a user may select a threshold determination method via a user input device, thereby enabling automatic determination of intensity thresholds according to a user preference. As an example, an image processing system may store an Otsu method flag in a threshold module in response to a user selection via a user input device, and based upon detection of the Otsu method flag, the image processing system may determine that an Otsu threshold method has been selected.

If at 502, it is determined that an Otsu threshold method has not been selected, method 500 may proceed to 504. At 504, the intensity of the background pixels/voxels of the MR image/map is evaluated, that is, the intensity of only those pixels classified as belonging to the background is evaluated. In some embodiment, a segmentation map, such as a segmentation map produced by CNN architecture 300, may be used to determine which pixels/voxels of an MR image/map correspond to background, and based on this determination, the intensity of each background pixel/voxel may be evaluated.

At 506, the first intensity threshold is set to the maximum intensity of the background pixels/voxels. That is, in some embodiments, an intensity of the single brightest pixel classified as belonging to the background may be set as the first threshold intensity, thereby effectively suppressing output of each background pixel.

If it is determined at 502 that the Otsu threshold method has been selected, method 500 proceeds to 508. In some embodiments, determining that the Otsu threshold method has been selected may be based on a pre-set user preference, stored within non-transitory memory of an image processing system.

At 508, an intensity distribution of the MR image/map is determined (that is, an intensity distribution of both the foreground and background is determined). In one embodiment, a histogram of pixel intensities may be generated, wherein the x-axis includes the pixel/voxel intensity, and the y-axis includes the number of pixels/voxels at each intensity level.

At 510, a first intensity threshold is set to an intensity which maximizes a between class variance (or equivalently, the first intensity threshold is set to an intensity which minimized the within class variance), of the intensity distribution determined at step 508. The between class variance is calculated for a first and second class, of the previously determined intensity distribution, by dividing the intensity distribution into a first class comprising pixels with intensity less than the selected intensity threshold, and a second class comprising pixels with intensity greater than the selected intensity threshold. An intensity threshold determined in this manner may herein also be referred to as an Otsu threshold, and in some embodiments, the first intensity threshold may be determined at step 510 based on the Otsu equation. Method 500 may then end.

In this way, method 500 may enable efficient and user friendly determination of a first intensity threshold to selectively apply to the background of an MR image/map. By enabling a user to select an intensity determination method preference, more efficient image processing workflows, and less user frustration, may be enabled.

Figure 6:
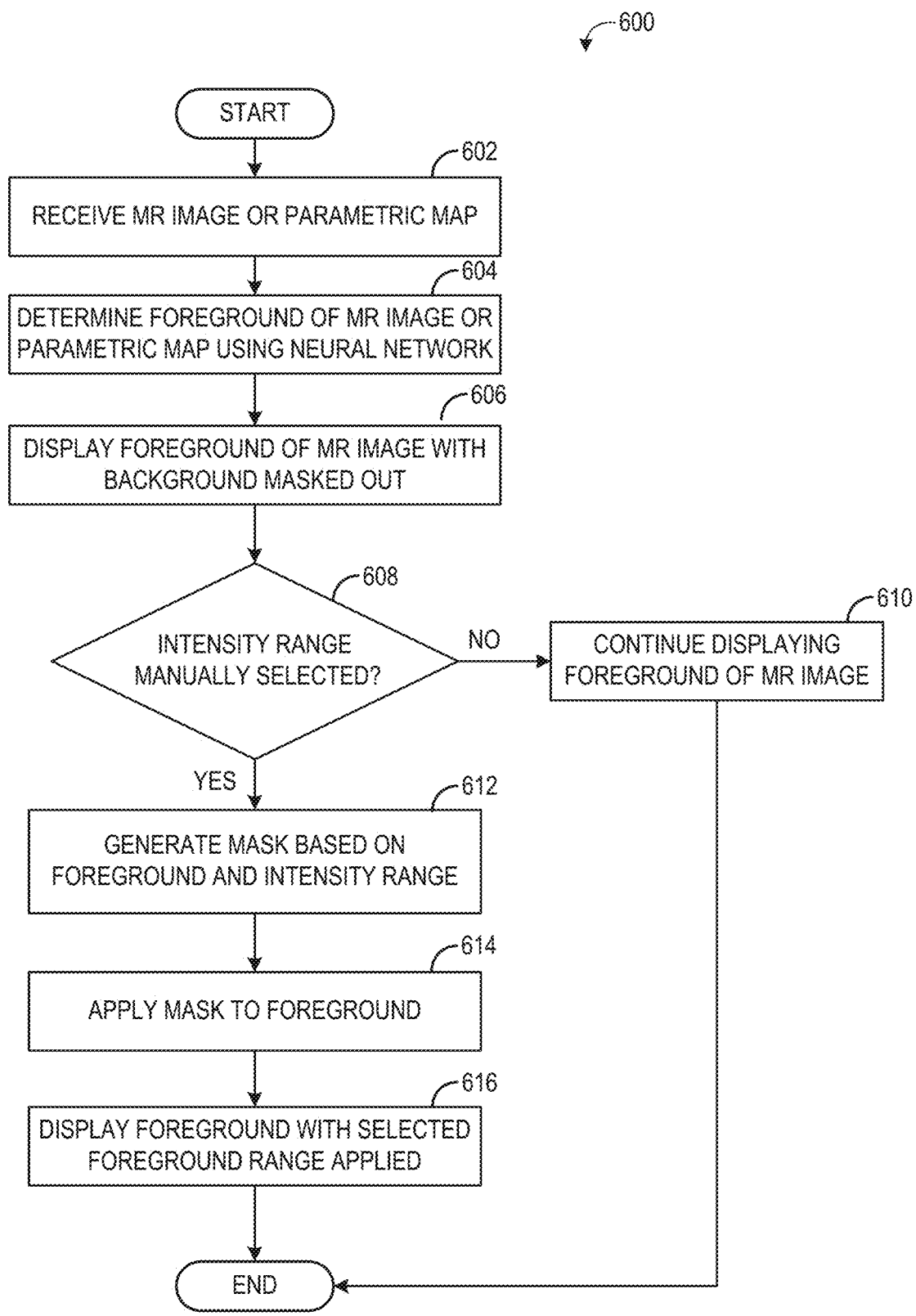
FIG. 6 shows a flowchart of an example method for reducing background noise in MR images and/or parametric maps, in accordance with another exemplary embodiment.

Turning to FIG. 6, an example method 600 for reducing background noise in an MR image/map is shown, in accordance with another exemplary embodiment. Method 600 may be executed by an image processing system, such as image processing system 200.

Method 600 begins at 602, which includes receiving an MR image or parametric map. In some embodiments, the image processing system may receive an MR image/map from an MRI system or from a storage device which stores the MR image/map generated by the MRI system.

At 604, foreground of the MR image/map is determined. In some embodiments, the foreground is determined by an analytical method, such as clustering, region growing, edge detection, etc. In some embodiments, a neural network is used to determine the foreground. In some embodiments, the neural network generates a segmentation/classification map based on the MR image/map, wherein the map is a matrix with values being either one (1) or zero (0), and wherein each pixel/voxel classified as background corresponds to a matrix value of zero, and each pixel/voxel classified as foreground corresponds to a matrix value of one.

At 606, the foreground of the MR image is displayed via a display device with the background masked out/discarded.

At 608, it is determined if an intensity range, comprising an upper intensity threshold and a lower intensity threshold, has been manually selected. In some embodiments, a user may select an intensity range via a user input device through a graphical user interface, such as graphical user interface 1300 shown in FIG. 13. If at 608 it is determined that no intensity range has been manually selected, method 600 may continue to display the foreground of the MR image and not the background as at 610.

However, if at 608, it is determined that an intensity range has been manually selected (e.g., via user input), method 600 proceeds to 612. At 612, a mask is generated for the foreground based on the selected intensity range and the foreground of the MR image/map. In some embodiments, generating a mask for the foreground includes comparing an intensity of each pixel/voxel of the foreground of the MR image/image against a lower intensity threshold and an upper intensity threshold of the selected intensity range, and in response to the intensity of the pixel/voxel being within the selected intensity range (that is, in response to the intensity of a pixel/voxel being both below an upper intensity threshold and above a lower intensity threshold), setting a mask value corresponding to the pixel/voxel to one, or otherwise setting the mask value corresponding to the pixel/voxel to zero if the intensity of the pixel/voxel is outside of the selected intensity range. In some embodiments, mask values corresponding to the background pixel/voxels are zero.

At 614, the mask is applied to the foreground of the MR image/map. In some embodiments, applying the mask to the foreground of the MR image/map includes multiplying the intensity of each foreground pixel/voxel by a corresponding mask value, wherein each pixel corresponds to a unique mask value, determined as indicated at step 612, wherein the product of the pixel/voxel intensity and the mask value for each pixel/voxel is set as the intensity of the new intensity adjusted foreground image.

At 616, method 600 includes displaying the intensity adjusted MR/map image via the display device. Method 600 may then end.

In this way, method 600 may enable total suppression of background noise, while further enabling a user to select an intensity range to selectively apply to the foreground. This may further enable a user to more clearly visualize one or more sub regions within a foreground (corresponding to an anatomical structure of interest) of an MR image/map by selecting an intensity range without consideration for background.

Turning to FIG. 7, an exemplary MR image 700 of abdomen is shown. Image 700 is an original DWI image without background suppression, which includes a background 702 (the relatively dark peripheral regions of image 700), separated by boundary 706 (the relatively bright boundary), from foreground 704 (the relatively bright region bounded by boundary 706, which corresponds to the imaged anatomical region). Background 702 includes a plurality of pixels, wherein an output/intensity of each of the background pixels has not yet been suppressed. Foreground 704 includes a second plurality of pixels, wherein an output/intensity of each of the foreground pixels is also not suppressed. Boundary 706 is merely illustrative in purpose, and is used to indicate where the background 702 and foreground 704 meet.

Similarly, FIG. 8, shows an exemplary MR image 800 of brain, which is an DWI image without background suppression. Image 800 includes a background 802 (the relatively dark peripheral regions of input image 800), separated by boundary 806 (the relatively bright boundary), from foreground 804 (the relatively bright region bounded by boundary 806, which corresponds to the imaged anatomical region). Background 802 includes a plurality of pixels, wherein an output/intensity of each of the background pixels has not yet been suppressed. Foreground 804 includes a second plurality of pixels, wherein an output/intensity of each of the foreground pixels is also not suppressed. Boundary 806 is merely illustrative in purpose, and is used to indicate where the background 802 and foreground 804 meet.

FIG. 9 shows an original MR image 902 of abdomen, a ground truth mask 904 determined manually based on the original MR image 902, and a predicted mask 906 (i.e., segmentation map) determined via a trained neural network. The ground truth mask 904 includes a human curated segmentation map, wherein lighter pixels correspond to foreground, and darker pixels correspond to background. The ground truth mask 904 represents the gold standard segmentation map, as it was produced by a human expert. Predicted mask 906 includes a segmentation map produced by a trained neural network, such as the CNN discussed with reference to CNN architecture 300, wherein lighter/brighter pixels correspond to pixels classified as foreground, and wherein darker pixels correspond to pixels classified as background. As shown in FIG. 9, agreement between the automatically produced predicted mask 906 and the gold standard ground truth mask 904 is good, demonstrating the ability of a trained neural network to produce segmentation maps which closely approximate human best efforts.

FIG. 9 also shows default threshold 908, illustrating the original MR image 902 with a pre-determined intensity threshold (i.e., default threshold) applied, wherein pixels within the original MR image 902 below the intensity threshold are suppressed/masked. As can be seen in FIG. 9, numerous holes occur within the anatomical regions of default threshold 908. Predicted threshold 910 depicts original MR image 902 with a predicted threshold applied (determined as the max intensity value of all background pixels) applied. Otsu threshold 912 depicts original MR image 902 with an Otsu threshold applied (determined based on Otsu's method using the full intensity distribution of original MR image 902). Although predicted threshold 910 and Otsu threshold 912 both reduce background noise to a greater extent, in the illustrated example, a degree of information loss from the anatomical regions of original MR image 902 is further exacerbated compared to default threshold 908. However, it is to be understood that in other examples, an image having an Otsu threshold applied thereto may have fewer loss of anatomical details than an associated image having a default threshold applied thereto.

FIG. 9 also includes a comparison between selective background repression methods. Applied ground truth mask 914 depicts original MR image 902 with the ground truth mask 904 applied, and therefore represents a human best effort at selectively suppressing background noise within the original MR image. Applied predicted mask 916 depicts the original image with the predicted mask 906 applied, to selectively suppress background noise. Applied predicted mask 916 is seen to be in close agreement with the human best effort shown by applied ground truth mask 914, although some pixels on the boundary of the anatomical features are segmented out. Finally, applied predicted mask+Otsu threshold 918, shows original MR image 902 with Otsu's threshold applied selectively to the background pixels as determined by predicted mask 906. As shown in FIG. 9, applied predicted mask+Otsu threshold 918 is in close agreement with applied ground truth mask 914.

FIG. 10 shows an original MR image 1002 of brain, a ground truth mask 1004 determined manually based on the original MR image 1002, and a predicted mask 1006 (segmentation map) determined via a trained neural network. The ground truth mask 1004 includes a human curated segmentation map, wherein lighter pixels correspond to foreground, and darker pixels correspond to background. The ground truth mask 1004 represents the gold standard segmentation map, as it was produced by a human expert. Predicted mask 1006 includes a segmentation map produced by a trained neural network, such as the CNN discussed with reference to CNN architecture 300, wherein lighter/brighter pixels correspond to pixels classified as foreground, and wherein darker pixels correspond to pixels classified as background. As shown in FIG. 10, agreement between the automatically produced predicted mask 1006 and the gold standard ground truth mask 1004 is good, demonstrating the ability of a CNN to produce segmentation maps which closely approximate human best efforts.

FIG. 10 also shows default threshold 1008, illustrating the original MR image 1002 with a pre-determined intensity threshold applied, wherein pixels within the original MR image 1002 below the intensity threshold are suppressed/masked. As can be seen in FIG. 10, numerous holes occur within the anatomical regions of default threshold 1008. Predicted threshold 1010 and Otsu threshold 1012 likewise depict original MR image 1002 with either a predicted threshold applied (determined as the max value of all background pixels) or an Otsu threshold applied (determined based on Otsu's method using the full intensity distribution of original MR image 1002), respectively. Although predicted threshold 1010 and Otsu threshold 1012 both reduce background noise to a greater extent, in the illustrated example, a degree of information loss from the anatomical regions of original MR image 1002 is further exacerbated compared to default threshold 1008. However, it is to be understood that in other examples, an image having an Otsu threshold applied thereto may have fewer loss of anatomical details than an associated image having a default threshold applied thereto.

FIG. 10 also includes a comparison between selective background repression methods. Applied ground truth mask 1014 depicts original MR image 1002 with the ground truth mask 1004 applied, and therefore represents a human best effort at selectively suppressing background noise within the original MR image. Applied predicted mask 1016 depicts the original image with the predicted mask 1006 applied, to selectively suppress background noise. Applied predicted mask 1016 is seen to be in close agreement with the human best effort shown by applied ground truth mask 1014, although some pixels on the boundary of the anatomical features are segmented out. Finally, applied predicted mask+ Otsu threshold 1018, shows original MR image 1002 with Otsu's threshold applied selectively to the background pixels as determined by predicted mask 1006. As shown in FIG. 10, applied predicted mask+Otsu threshold 1018 is in close agreement with applied ground truth mask 1014.

FIG. 11 shows a side-by-side comparison of MR images of abdomen with and without background suppression in a visualization application. The visualization application uses "windowing" approach to visualize MR images captured with higher precisions or higher dynamic ranges of intensity values than standard images, which maps an intensity interval of interest to the dynamic range of the display. The applications set up the range of interval and center of this interval for the mapping. In the original MR image 1102, the range of interval and center of interval are not optimal due to background noise, where a substantial amount of noise from the background pixels may be observed, and some of the boundary of the anatomical features of the image is lost. An example reference for visualization of the anatomical features of original MR image 1102 is shown in LAVA FLEX 1106. LAVA FLEX images may be used for verifying correct anatomical details and anatomical feature boundary. It is to be understood that any suitable reference for verifying correct anatomical details and anatomical feature boundary may be used similarly to the LAVA FLEX images described herein. Noise reduced image 1104, which represents an MR image with background noise selectively reduced according to the methods herein disclosed, shows improved image quality compared to original MR image 1102.

Similar to FIG. 11, FIG. 12 illustrates original MR image 1202, wherein a substantial amount of noise from the background pixels may be observed, and some of the boundary of the anatomical features of the image is lost. An example reference for visualization of the anatomical features of original MR image 1202 is shown in LAVA FLEX 1206. Noise reduced image 1204, which represents original MR image 1202 with background noise selectively reduced according to the methods herein disclosed, shows improved image quality compared to the original MR image 1202.

FIG. 13 illustrates an example graphical user interface (GUI) 1300 comprising intensity threshold control interface 1302, in accordance with an exemplary embodiment. The intensity threshold control interface 130 includes a bar with a lower intensity threshold 1306 and an upper intensity threshold 1304, wherein a user may adjust the lower intensity threshold 1306 and/or the upper intensity threshold 1304 via a user input device. For example, the user may select the intensity range used in method 600 by adjusting the lower intensity threshold 1306 and the upper intensity threshold 1304.

As described above, background noise may be selectively reduced by first segmenting the MR image or parametric map into foreground (the region of anatomy of interest in the MR image) and background (outside of the region of anatomy of interest), and then applying an intensity threshold selectively to the background, and not the foreground. This may enable greater background noise reduction while reducing or eliminating holes in the anatomical regions of the MR image/map, as even if a region of the foreground includes pixels of a lower intensity than the intensity threshold, the foreground pixels may remain unmasked, as the intensity threshold is applied selectively to the background pixels. Thus, a higher intensity threshold may be applied to the background than would otherwise be feasible, enabling greater background noise reduction without losing information from the anatomical regions of the MR image.

The above described systems and methods for reducing background noise in MR images may use a trained neural network to segment MR images/maps into foreground and background. A technical effect of classifying a plurality of pixels/voxels comprising an MR image/map as foreground or background using a trained neural network, determining an intensity threshold based on the MR image/map, and applying the intensity threshold to the background pixels/voxels, and not the foreground pixels/voxels, is that a greater degree of background noise reduction may be achieved, while mitigating loss of anatomical regions in the foreground by formation of "holes". A further technical effect of the above approach is that MR images of substantially any anatomical regions may be segmented using the trained neural network of the subject application, and therefore the above approach may be applied to MR images/maps of anatomical structures generally, without significant alterations to the method workflow or the parameters of the neural network.

As used herein, an element or step recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for visualizing a magnetic resonance (MR) image, comprising:
   segmenting the MR image into foreground which includes a region of anatomy of interest and background which is outside of the region of anatomy of interest;
   calculating an Otsu threshold based on the MR image;
   setting an intensity threshold to the Otsu threshold;
   applying the intensity threshold to the background and not applying the intensity threshold to the foreground of the MR image to produce a noise reduced MR image, wherein applying the intensity threshold to the background includes masking pixels or voxels of the background with intensity less than the intensity threshold;
   displaying the noise reduced MR image via a display device;
   receiving a user selected intensity threshold;
   applying the user selected intensity threshold to the background and not applying the user selected intensity threshold to the foreground to produce a second noise reduced MR image; and
   displaying the second noise reduced MR image via the display device.

2. The method of claim 1, wherein segmenting the MR image into foreground and background comprises using a trained neural network to classify each pixel or voxel of the MR image as either foreground or background.

3. The method of claim 1, further comprising:
   determining a maximum intensity of the background; and
   setting the intensity threshold to the maximum intensity of the background.

4. The method of claim 3, further comprising:
   receiving a user selected intensity range;
   applying the user selected range to the noise reduced MR image; and
   displaying a subset of foreground within the user selected intensity range.

5. The method of claim 1, wherein the MR image is one of a functional MR image, a diffusion weighted image, or a perfusion-weighted image.

6. A method for visualizing an MR image, the method comprising:
   segmenting the MR image into foreground which includes a region of anatomy of interest and background which is outside of the region of anatomy of interest, wherein the MR image is a diffusion weighted image;
   comparing an intensity of each pixel or voxel of the background against an intensity threshold; and
   responsive to the pixel intensity being less than the intensity threshold, setting a value of a corresponding pixel or voxel in a mask to zero;
   applying the mask to the MR image to produce a noise reduced MR image;
   displaying the noise reduced MR image via a display device;
   receiving a user selected intensity range;
   applying the user selected intensity range to the noise reduced MR image; and
   displaying a subset of foreground based on the user selected intensity range.

7. A magnetic resonance (MR) image processing system comprising:
   an image processing system;
   a threshold module;
   a display device coupled to the image processing system;
   a user input device coupled to the image processing system; and
   wherein the image processing system is configured to:
      segment an MR image into foreground which includes a region of anatomy of interest and background which is outside of the region of anatomy of interest;
      calculate an Otsu threshold based on the MR image via the threshold module;
      set an intensity threshold to the Otsu threshold;
      apply the intensity threshold to the background but not apply the intensity threshold to the foreground of the MR image to produce a noise reduced MR image;
      make the display device display the noise reduced MR image;
      receive a user selected intensity threshold via the user input device;
      apply the user selected intensity threshold to the background of the MR image and not apply the user selected intensity threshold to the foreground of the MR image to produce a second noise reduced MR image; and
      display the second noise reduced MR image via the display device.

8. The MR image processing system of claim 7, wherein applying the intensity threshold to the background but not applying the intensity threshold to the foreground to produce the noise reduced MR image comprises:
   comparing an intensity of each pixel or voxel of the background against the intensity threshold; and
   responding to the intensity of the pixel or voxel being less than the intensity threshold by setting the intensity of the pixel or voxel to zero.

9. The MR image processing system of claim 7, further comprising a storage device storing a trained neural network, wherein segmenting the MR image into foreground and background comprises using the trained neural network to
   classify each pixel or voxel of the MR image as either foreground or background.

10. The MR image processing system of claim 9, wherein the trained neural network is a convolutional neural network.

11. The MR image processing system of claim 7, further comprising a threshold module, wherein the threshold module is configured to:
   determine a maximum intensity of the background; and
   set the intensity threshold to the maximum intensity of the background.

12. The MR image processing system of claim 7, wherein the image processing system is further configured to:
   receive a user selected intensity range via the user input device;
   apply the user selected intensity range to the noise reduced MR image; and
   display a subset of foreground within the user selected intensity range via the display device.

13. The MR image processing system of claim 7, wherein the MR image is one of a functional MR image, a diffusion weighted image, or a perfusion-weighted image.

* * * * *